United States Patent
Wares et al.

(10) Patent No.: US 12,255,577 B2
(45) Date of Patent: Mar. 18, 2025

(54) PHOTOVOLTAIC MODULE MOUNT

(71) Applicant: TotalEnergies OneTech, Solaize (FR)

(72) Inventors: Brian S. Wares, Berkeley, CA (US); Vicent Ripoll Agullo, Oakland, CA (US); Tyler Grushkowitz, Hayward, CA (US)

(73) Assignee: TotalEnergies OneTech, Solaize (FR)

( * ) Notice: Subject to any disclaimer, the term of this patent is extended or adjusted under 35 U.S.C. 154(b) by 0 days.

(21) Appl. No.: 18/461,175

(22) Filed: Sep. 5, 2023

(65) Prior Publication Data

US 2023/0412118 A1 Dec. 21, 2023

Related U.S. Application Data

(63) Continuation of application No. 17/143,100, filed on Jan. 6, 2021, now abandoned, which is a continuation
(Continued)

(51) Int. Cl.
*H02S 30/10* (2014.01)
*F24S 25/16* (2018.01)
(Continued)

(52) U.S. Cl.
CPC ............. *H02S 30/10* (2014.12); *F24S 25/16* (2018.05); *F24S 25/20* (2018.05); *F24S 25/60* (2018.05);
(Continued)

(58) Field of Classification Search
None
See application file for complete search history.

(56) References Cited

U.S. PATENT DOCUMENTS

| RE21,793 E | 5/1941 | Maclean |
|---|---|---|
| 6,370,828 B1 | 4/2002 | Genschorek |

(Continued)

FOREIGN PATENT DOCUMENTS

| DE | 102012108138 | 3/2014 |
|---|---|---|
| EP | 2362161 | 8/2011 |

(Continued)

OTHER PUBLICATIONS

Examination Report No. 1 from Australian Patent Application No. 2016226556 dated Jun. 30, 2020, 5 pgs.
(Continued)

*Primary Examiner* — Phi D A
(74) *Attorney, Agent, or Firm* — Oblon, McClelland, Maier & Neustadt, L.L.P.

(57) ABSTRACT

Mounting components of photovoltaic (PV) modules and PV module assemblies are described, including PV module couplings and PV module mounting chassis. In an example, a PV module includes a PV module coupling having a toe portion extending from a PV module frame, and a PV module mounting chassis includes a toe slot to receive the toe. The toe and toe slot construction allows for the PV module frame to be assembled to the PV module mounting chassis without using tools, and thus, permits a PV module assembly to be quickly constructed during installation of a PV module system. Furthermore, the toe and toe slot construction accommodates thermal expansion and other environmental loads seen after installation, while providing a grounding connection for the PV module assembly.

13 Claims, 20 Drawing Sheets

Related U.S. Application Data of application No. 16/206,818, filed on Nov. 30, 2018, now Pat. No. 10,917,040, which is a continuation of application No. 14/923,373, filed on Oct. 26, 2015, now Pat. No. 10,171,027.

(60) Provisional application No. 62/127,230, filed on Mar. 2, 2015.

(51) Int. Cl.
| | |
|---|---|
| *F24S 25/20* | (2018.01) |
| *F24S 25/60* | (2018.01) |
| *F24S 25/632* | (2018.01) |
| *H02S 20/24* | (2014.01) |
| *H02S 20/30* | (2014.01) |
| *H02S 40/36* | (2014.01) |
| *F24S 25/00* | (2018.01) |
| *F24S 25/61* | (2018.01) |

(52) U.S. Cl.
CPC ............ *F24S 25/632* (2018.05); *H02S 20/24* (2014.12); *H02S 20/30* (2014.12); *H02S 40/36* (2014.12); *F24S 2025/013* (2018.05); *F24S 2025/014* (2018.05); *F24S 2025/019* (2018.05); *F24S 2025/6002* (2018.05); *F24S 2025/6007* (2018.05); *F24S 25/61* (2018.05); *Y02B 10/10* (2013.01); *Y02E 10/47* (2013.01)

(56) References Cited

U.S. PATENT DOCUMENTS

| | | | |
|---|---|---|---|
| 6,414,237 B1* | 7/2002 | Boer | H02S 20/23 52/173.3 |
| 7,155,870 B2* | 1/2007 | Almy | H02S 20/23 52/173.3 |
| 7,814,899 B1* | 10/2010 | Port | F24S 25/20 52/173.3 |
| 8,245,460 B2* | 8/2012 | Yamanaka | F24S 25/30 52/173.3 |
| 8,272,176 B2* | 9/2012 | Wallgren | F24S 25/13 52/173.3 |
| 8,511,008 B2* | 8/2013 | Sagayama | F24S 25/636 52/173.3 |
| 8,572,909 B2 | 11/2013 | Riveria et al. | |
| 8,601,755 B2* | 12/2013 | Clarkson | H02S 20/23 52/173.3 |
| 8,635,818 B2* | 1/2014 | Wildes | H02S 20/23 52/173.3 |
| 8,726,897 B2 | 5/2014 | Wallgren | |
| 8,763,346 B2* | 7/2014 | Kuster | H02S 20/23 126/621 |
| 8,813,440 B2* | 8/2014 | Potter | H02S 20/00 52/173.3 |
| 8,832,938 B2* | 9/2014 | Gies | F24S 25/30 52/173.3 |
| 8,844,125 B2 | 9/2014 | Rendek et al. | |
| 8,869,471 B2* | 10/2014 | Wildes | F24S 25/636 52/173.3 |
| 8,898,971 B2* | 12/2014 | West | F24S 25/632 52/173.3 |
| 8,987,584 B2 | 3/2015 | Rawlings | |
| 9,003,729 B2* | 4/2015 | West | H02S 20/10 52/173.3 |
| 9,038,329 B2* | 5/2015 | Pelman | F24S 25/632 52/173.3 |
| 9,093,948 B2 | 7/2015 | Walz | |
| 9,115,915 B2 | 8/2015 | Lu et al. | |
| 9,276,521 B2 | 3/2016 | Reed et al. | |
| 9,314,904 B2 | 4/2016 | Veloso | |
| 9,331,222 B2 | 5/2016 | Song et al. | |
| 9,748,891 B2 | 8/2017 | Chavez | |
| 10,256,767 B1 | 4/2019 | Sinai | |
| 11,689,148 B2* | 6/2023 | Dick | F24S 25/65 52/173.3 |
| 11,689,149 B2* | 6/2023 | Clemente | H02S 30/10 52/173.3 |
| 11,722,093 B2* | 8/2023 | De Bie | F24S 25/615 52/173.3 |
| 11,728,758 B1* | 8/2023 | Jaramillo | F24S 25/61 52/173.3 |
| 11,728,760 B2* | 8/2023 | Lepley | F24S 25/65 52/173.3 |
| 2002/0033436 A1 | 3/2002 | Penq et al. | |
| 2008/0053517 A1 | 3/2008 | Plaisted | |
| 2008/0169018 A1 | 7/2008 | Miyamoto et al. | |
| 2009/0025314 A1* | 1/2009 | Komamine | F24S 25/61 52/173.3 |
| 2010/0077679 A1* | 4/2010 | Sagayama | F24S 25/13 52/173.3 |
| 2010/0243023 A1 | 9/2010 | Patton | |
| 2011/0070765 A1 | 3/2011 | Kobayashi | |
| 2011/0278411 A1 | 11/2011 | Carbonare | |
| 2011/0297808 A1 | 12/2011 | Yamanaka et al. | |
| 2011/0314752 A1* | 12/2011 | Meier | F24S 25/20 52/173.3 |
| 2012/0036799 A1* | 2/2012 | Kneip | F24S 25/10 248/220.21 |
| 2012/0048345 A1 | 3/2012 | Wood | |
| 2012/0186169 A1* | 7/2012 | Tomaso | F24S 25/13 52/173.3 |
| 2012/0240489 A1* | 9/2012 | Rivera | F24S 25/636 52/173.3 |
| 2012/0260977 A1 | 10/2012 | Stancel | |
| 2012/0298201 A1 | 11/2012 | Stephan | |
| 2013/0125959 A1 | 5/2013 | Saqayama et al. | |
| 2013/0133275 A1* | 5/2013 | Bindschedler | F24S 25/11 52/173.3 |
| 2013/0136528 A1 | 5/2013 | Kellerman | |
| 2013/0192150 A1* | 8/2013 | DuPont | F24S 25/634 52/173.3 |
| 2013/0276867 A1 | 10/2013 | Wildes | |
| 2013/0312812 A1 | 11/2013 | Meyer | |
| 2013/0318893 A1* | 12/2013 | Knapp | F24S 25/617 52/173.3 |
| 2014/0083028 A1 | 3/2014 | Richardson | |
| 2014/0083488 A1 | 3/2014 | Song | |
| 2014/0102016 A1* | 4/2014 | Hemingway | H02S 20/00 52/173.3 |
| 2014/0154423 A1 | 6/2014 | Jo et al. | |
| 2014/0190096 A1* | 7/2014 | Kacandes | F24S 40/44 52/173.3 |
| 2014/0299179 A1 | 10/2014 | West et al. | |
| 2014/0345212 A1* | 11/2014 | Yoon | F24S 25/10 52/173.3 |
| 2014/0360111 A1* | 12/2014 | Kuan | F24S 25/13 52/173.3 |
| 2015/0013756 A1 | 1/2015 | West et al. | |
| 2015/0040967 A1 | 2/2015 | West | |
| 2015/0042260 A1 | 2/2015 | Sturm | |
| 2015/0229262 A1 | 8/2015 | Rawlings et al. | |
| 2015/0288320 A1* | 10/2015 | Stearns | F24S 25/60 52/173.3 |
| 2015/0349700 A1* | 12/2015 | Port | F24S 25/50 52/173.3 |
| 2016/0072426 A1* | 3/2016 | Babineau, Jr. | F24S 25/634 52/173.3 |
| 2016/0308486 A1 | 10/2016 | Atia et al. | |
| 2018/0026576 A1* | 1/2018 | Danning | F24S 20/67 52/173.3 |
| 2023/0112327 A1* | 4/2023 | Kovacs | F24S 25/632 52/173.3 |
| 2023/0155536 A1* | 5/2023 | Affentranger, Jr. | F24S 25/30 52/173.3 |

FOREIGN PATENT DOCUMENTS

| | | |
|---|---|---|
| JP | 2000129877 | 5/2000 |
| JP | 2008506057 | 2/2008 |
| JP | 3140226 | 3/2008 |

(56) References Cited

FOREIGN PATENT DOCUMENTS

| | | |
|---|---|---|
| JP | 2008-214875 | 9/2008 |
| JP | 4790718 | 10/2011 |
| JP | 2012-162979 | 8/2012 |
| JP | 2012229601 | 11/2012 |
| JP | 2013118236 | 6/2013 |
| JP | 5242615 | 7/2013 |
| JP | 2014506775 | 3/2014 |
| JP | 5584810 | 9/2014 |
| JP | 5595420 | 9/2014 |
| JP | 2014-211011 | 11/2014 |
| JP | 5636021 | 12/2014 |
| JP | 5641632 | 12/2014 |
| JP | 2015505232 | 2/2015 |
| JP | 5693136 | 4/2015 |
| WO | 2009120923 | 10/2009 |
| WO | 2009137809 | 11/2009 |
| WO | 2012065251 | 5/2012 |
| WO | 2013056101 | 4/2013 |
| WO | 2013078533 | 6/2013 |
| WO | 2013143178 | 10/2013 |
| WO | 2013186217 | 12/2013 |
| WO | 2014004279 | 1/2014 |
| WO | 2014039967 | 3/2014 |
| WO | 2015042260 | 3/2015 |

OTHER PUBLICATIONS

Official Action from Mexican Patent Application No. MX/a/2017/009120 dated Aug. 20, 2020, 5 pgs.

Notice for Reasons for Refusal from Japanese Patent Application No. 2017-532040 dated Dec. 4, 2019, 5 pgs.

Notice of Reasons for Refusal from European Patent Application No. 16 759 250.0-1009 mailed Nov. 26, 2018, 6 pgs.

Database—WPI, Section EI, Week 201467 Thomson Scientific, London GB Class X15, AN 2014-S4861.

Extended European Search Report from European Patent Application No. 16759250.0 mailed Mar. 12, 2018, 18 pgs.

PCT International Search Report and Written Opinion for PCT International Appln No. PCT/US2016/017409 mailed May 26, 2016, 7 pgs.

International Preliminary Report on Patentability from PCT/US2016/017409 mailed Sep. 14, 2017, 8 pgs.

* cited by examiner

PHOTOVOLTAIC MODULE MOUNT

CROSS-REFERENCE TO RELATED APPLICATIONS

This application is a continuation of and claims benefit under 35 U.S.C. § 120 to U.S. patent application Ser. No. 17/143,100, filed on Jan. 6, 2021, which is a continuation of U.S. patent application Ser. No. 16/206,818, filed on Nov. 30, 2018, now U.S. Pat. No. 10,917,040, issued on Feb. 9, 2021, which is a continuation of U.S. patent application Ser. No. 14/923,373, filed on Oct. 26, 2015, now U.S. Pat. No. 10,171,027, issued on Jan. 1, 2019, which claims priority from U.S. Patent Application No. 62/127,230, filed on Mar. 2, 2015, the entire contents of which are hereby incorporated by reference herein.

RELATED APPLICATIONS

This application claims the benefit of priority from U.S. Provisional Patent Application Ser. No. 62/127,230 filed on Mar. 2, 2015, the full disclosure of which is incorporated herein by reference.

BACKGROUND

Photovoltaic (PV) cells, commonly known as solar cells, are well known devices for converting solar radiation into electrical energy. PV cells can be assembled into PV panels, which may be used to convert sunlight into electricity. The electricity produced by the PV panels may be transmitted by cables for residential and/or commercial use.

Several PV panels may be included in a PV module system, and the PV panels are typically mounted on an external structure or a support surface, e.g., a roof of a building, and tilted toward the sun to maximize energy conversion. PV panels of the PV module system are grounded. A module frame usually supports a perimeter of a PV panel of the PV module system and a module chassis usually supports the module frame on the support surface. Mounting components are used to attach the module frame to the module chassis.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
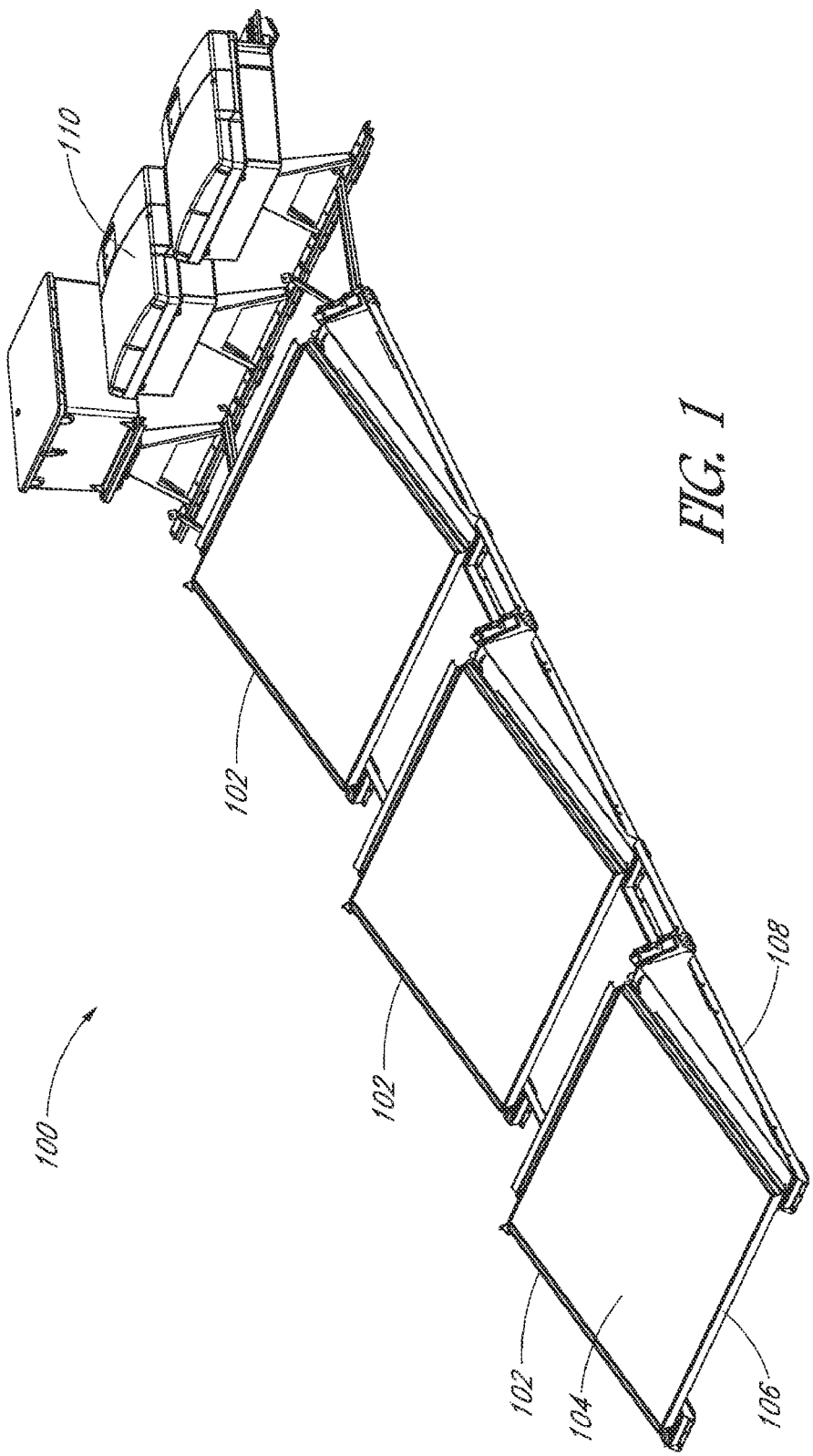
FIG. 1 illustrates a perspective view of a photovoltaic (PV) module system, in accordance with an embodiment of the present disclosure.

Mounting components to support photovoltaic (PV) modules are described herein. The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" location does not necessarily imply that this location is the first location in a sequence; instead the term "first" is used to differentiate this location from another location (e.g., a "second" location).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Existing mounting components include threaded fasteners, e.g., screws and bolts, to attach a module frame to a module chassis and/or the module chassis to a support surface. Such fasteners typically require tools to tighten the fasteners, and the tools and tightening process add to the overall installation time and costs. Furthermore, since existing mounting fasteners may be closely fit and/or tightened to each other, thermal expansion seen at the installation site, e.g., during cold or hot weather, can induce material strain in the fasteners and result in loosening of the fasteners over time. Thus, providing mounting components that assemble quickly without tools and that accommodate thermal expansion in the assembled state can reduce installation costs, and can provide a PV module system that is more resistant to weathering.

PV modules require reliable electrical grounding, and currently the grounding requires pin contacts to pierce the module frame. Relative motion between a grounding pin and the PV module can cause material wear, which increases the resistance of the grounding path. Thus, providing a grounding connection through the mounting components and/or the module frame can reduce the likelihood of ground path deterioration.

In an aspect, a PV module coupling having a toe portion and a retainer portion can simplify an installation process of the PV module and can facilitate stacking of PV modules for safe and efficient transportation to an installation site. The PV module coupling may be mounted on the PV module frame such that the toe portion extends longitudinally outward from an edge of the frame. Thus, the toe may be received by a slot in a mating component. The toe slot may be larger than the toe portion to accommodate thermal expansion after installation, and the slot may be sized to resist removal of the toe portion when the toe portion is pivoted to a secured state within the toe slot. The retainer portion may extend downward from the PV module frame along a plane orthogonal to the frame. Accordingly, the retainer portion and the PV module frame may essentially form an internal corner that may be stacked on an external corner of a mating PV module frame to secure the PV modules during transportation.

In an aspect, a PV module mounting chassis includes a grounding plate component having a toe slot to receive a toe portion of a PV module coupling, and a contact surface to provide a grounding connection from the PV module to the PV module mounting chassis. As described above, the toe slot may be sized to accommodate thermal expansion of the toe portion and to resist removal of the toe portion when the toe portion has been pivoted into a secured state. The contact surface may be vertically higher than the toe slot such that a PV module frame connected to the toe portion rests in contact with the contact surface when the toe portion is in the secured state, e.g., when the PV module is tilted in a southerly facing direction. Thus, the contact surface may press against the PV module frame to create a grounding connection between the PV module and the PV module mounting chassis.

In an aspect, a PV module mounting chassis includes a module stand having a support surface to hold a PV module in a tilted state, and a locking plate component having a toe slot to receive a toe portion of a PV module coupling and to retain the PV module under wind loading. As described above, the toe slot may be sized to accommodate thermal expansion of the toe portion and to resist removal of the toe portion when the toe portion has been pivoted into a secured state. The locking plate may be hinged to the upright, and may be resiliently deflectable away from the upright at a hinge point. Thus, when the toe portion is pivoted into the secured state, the toe portion may strike the locking plate to deflect the locking plate outward, making room for the toe portion to slide between the upright and the locking plate into the toe slot. The locking plate may then deflect inward toward the upright to lock the toe portion in place and to create a grounding connection between the PV module and the PV module mounting chassis.

In an aspect, a PV module mounting assembly includes a PV module frame having a first toe configured to insert into a toe slot of a PV module mounting chassis when the PV module frame is in a first configuration. The first toe is further adapted to inhibit removal of the first toe from the toe slot when the PV module frame is in a second configuration. Furthermore, the PV module frame may include a second toe configured to engage a toe slot in a locking plate of the PV module mounting chassis when the PV module frame is and the second configuration. Accordingly, the first toe of the PV module frame may be stabbed into the toe slot in the first configuration, and then the PV module frame may be pivoted about the first toe to snap the second toe into the other toe slot. The installation process can be completed quickly without the need for tools, e.g., wrenches, to tighten threaded fasteners.

The aspects described above may be realized by the mounting components and methods disclosed herein. In the following description, numerous specific details are set forth, such as specific material regimes and component structures, in order to provide a thorough understanding of embodiments of the present disclosure. It will be apparent to one skilled in the art that embodiments of the present disclosure may be practiced without these specific details. In other instances, well-known fabrication techniques or component structures, such as specific types of welding or riveting processes, are not described in detail in order to not unnecessarily obscure embodiments of the present disclosure. Furthermore, it is to be understood that the various embodiments shown in the figures are illustrative representations and are not necessarily drawn to scale.

By way of summary, disclosed herein are PV module couplings. In an embodiment, a PV module coupling includes a body plate extending along a first plane between a first end and a second end. A retainer may extend downward from the second end and include a retention surface orthogonal to the body plate. Furthermore, a toe may extend orthogonal to the retention surface of the retainer to a terminal edge beyond the second end of the body plate. Thus, the retainer of the PV module coupling may align a first PV module (that the PV module coupling is attached to) with another PV module stacked below the first PV module. Furthermore, the toe may engage a slot in a corresponding mounting chassis to physically connect the PV module with the mounting chassis. In an embodiment, the PV module coupling may be at least partially composed of stainless steel to provide good electrical grounding and weather resistance.

The PV module coupling may include various alignment features. For example a first alignment tab may extend upward from the body plate to wrap around the side of a frame rail of the first PV module. The first alignment tab may extend from a first sidewall of the body plate. Similarly, a second alignment tab may extend from a second sidewall set on an opposite side of an upper face of the body plate. Thus, the first and second alignment tabs may include respective inward surfaces facing each other across the upper surface of the body plate. The inward surfaces may be separated by a distance greater than a width of the upper surface such that the alignment tabs may extend along the side the frame rail to prevent relative lateral movement between the PV module coupling and the frame rail of the first PV module.

In addition to alignment features, the PV module coupling may include features to facilitate an attachment between the PV module coupling and the first PV module. For example, the body plate may include a port through the upper surface through which a rivet or threaded fastener may be placed to mate with a corresponding receiving opening in a frame rail.

Also by way of summary, disclosed herein are PV module mounting chassis. In an embodiment, a PV module mounting chassis includes a bridging member having an elongated body between a first end and a second end. For example, the elongated body may include a pair of elongated rails. The PV module mounting chassis may include a functional component attached to an end of the elongated body. For example, a grounding plate may be coupled at the first end to physically connect with a corresponding PV module coupling of a PV module, and to ground the PV module through the PV module mounting chassis. The grounding plate may include a toe receiving portion and a contact portion. The toe receiving portion may include an upper receiving surface and an upper toe slot through the upper receiving surface. The contact portion may include a contact surface vertically higher than the upper receiving surface, and the contact surface may be electrically connected to the second end of the PV module mounting chassis through the bridging member. In an embodiment, the contact portion includes a spring contact having the contact surface, and the spring contact is resiliently deflectable.

A different functional component may be attached to the second end of the PV module mounting chassis. For example, a tab plate may be attached to the elongated body at the second end. The tab plate may include a tab extending vertically upward to engage a functional component of an adjacent mounting chassis. In an embodiment, the different functional component is a module stand, which engages the tab plate at the second end. The module stand may include a base portion and an upright extending from the base portion to a support surface. The support surface may support a frame rail of a PV module and may electrically connect to a corresponding PV module coupling to electrically ground the PV module through the module stand. The module stand may include a locking plate having a locking surface coupled to the upright, and the locking plate may also include a locking toe slot through the locking surface. The locking plate may be hinged to the upright such that the locking plate resiliently deflects away from the upright about a hinge point. Furthermore, the locking plate may include a striking surface extending from an upper edge of the locking surface at an oblique angle to the support surface. Thus, when the corresponding PV module coupling is lowered toward the locking plate, the coupling may contact the striking surface to resiliently deflect the locking plate outward. When the locking plate snaps back toward the upright, the locking toe slot may engage a toe of the corresponding PV module coupling to lock it in place and to electrically ground the PV module through the module stand.

The module stand may include alignment features to accurately locate the module stand relative to the PV module and to an adjacent module chassis. For example, the module stand may include a pair of alignment protrusions extending upward from the support surface and a rail notch may be defined between the alignment protrusions and the support surface. The rail notch may be longitudinally aligned with the locking toe slot such that, when a toe of a corresponding PV module coupling engages the locking toe slot, a frame rail attached to the corresponding PV module coupling rests within the rail notch. The module stand may also include various slots to receive corresponding tabs from an adjacent mounting chassis. For example, the base portion of the module stand may include a side receiving surface and a side toe slot through the side receiving surface. A tab extending from an adjacent mounting chassis, e.g., from a tab plate at the second end of the chassis as described above, may be inserted into the side toe slot to accurately locate the adjacent mounting chassis relative to the module stand.

Also by way of summary, disclosed herein are PV module mounting assemblies. In an embodiment, a PV module mounting assembly includes a PV module frame connected to a PV module mounting chassis. The PV module mounting chassis may include a grounding plate having a toe receiving portion, the toe receiving portion having an upper toe slot in an upper receiving surface. The PV module mounting chassis may include a module stand including an upright having a support surface vertically higher than the upper receiving surface. The PV module mounting chassis may include a bridging member having a first member end and a second member end, the bridging member coupled to the grounding plate at the first member end and coupled to the module stand at the second member end. In an embodiment, the PV module frame includes an elongated frame rail having an underside between a first rail end and a second rail end. The underside may be mounted on the support surface of the upright of the PV module mounting chassis at the second rail end. The PV module frame may include a first PV module coupling including a body plate, a retainer, and a toe. The body plate may be coupled to the underside of the frame rail at the first rail end, the retainer may extend from the body plate through the upper toe slot of the toe receiving portion, and the toe may extend from the retainer to a terminal edge underneath the upper receiving surface.

The grounding plate of the PV module mounting assembly may include a contact portion having a contact surface vertically higher than the upper receiving surface. The underside of the frame rail may be mounted on the contact surface at the first rail end to electrically connect the grounding plate to the module stand through the frame rail.

In an embodiment, the module stand may include a locking plate having a locking surface attached to the upright. The locking plate may include a locking toe slot through the locking surface, and the PV module frame may further include a second PV module coupling having a second body plate and a second toe. The second body plate may be coupled to the underside of the frame rail at the second rail end, and the second toe may extend through the locking toe slot in the locking surface. In an embodiment, the locking plate includes a striking surface extending from an upper edge of the locking surface at an oblique angle to the support surface, and the second toe extends through the locking toe slot to a second terminal edge below the striking surface.

In an embodiment, when the frame rail is in a stab configuration, the first toe may be inserted into the upper toe slot. When the frame rail is in a rest configuration, however, removal of the first toe from the upper toe slot may be inhibited. The frame rail may be pivoted about the first toe from the stab configuration, when the frame rail is essentially orthogonal to the PV module mounting chassis, to the rest configuration, when the frame rail rests on the support surface of the module stand. When the frame rail is pivoted from the stab configuration to the rest configuration, the frame rail (or a PV module coupling attached to the frame rail) may press against the contact surface of the grounding plate. For example, the contact surface may be on a spring contact extending upward from a contact portion of the grounding plate. Accordingly, in the rest configuration, the grounding plate may be electrically connected to the module stand through the frame rail.

When the frame rail rests on the support surface in the rest configuration, the second toe may engage the locking toe slot in the locking plate of the module stand. More particularly, the locking plate may include a locking surface attached to the upright, and the locking toe slot may be formed through the locking surface and aligned with the second toe. The locking plate may include a striking surface extending from an upper edge of the locking surface at an oblique angle to the support surface, and thus, when the second toe is lowered toward the rest configuration, it may contact the striking surface to resiliently deflect the locking plate away from the upright. When the PV module coupling rests on the support surface in the rest configuration, the locking plate may snap back into place, such that the locking toe slot engages the second toe to secure the PV module in place and to electrically ground the PV module through the module stand.

Referring to FIG. 1, a perspective view of a PV module system is illustrated in accordance with an embodiment of the present disclosure. A PV module system 100 includes one or more PV modules 102 positioned at predetermined locations and orientations relative to each other and to the sun. More particularly, each PV module 102 may include a PV panel 104 held in the predetermined orientation by a PV module frame 106 mounted on a respective module chassis 108. PV module system 100 may include other components, such as one or more inverter 110, to facilitate electrical conversion and electrical communication between PV module system 100 and an external power system or grid. Furthermore, PV module system 100 may include cabling and other electrical accessories to facilitate system function. System function includes appropriate electrical grounding of PV panels 104 and resistance to adverse weather, and the mounting components described below provide this function.

Figure 2:
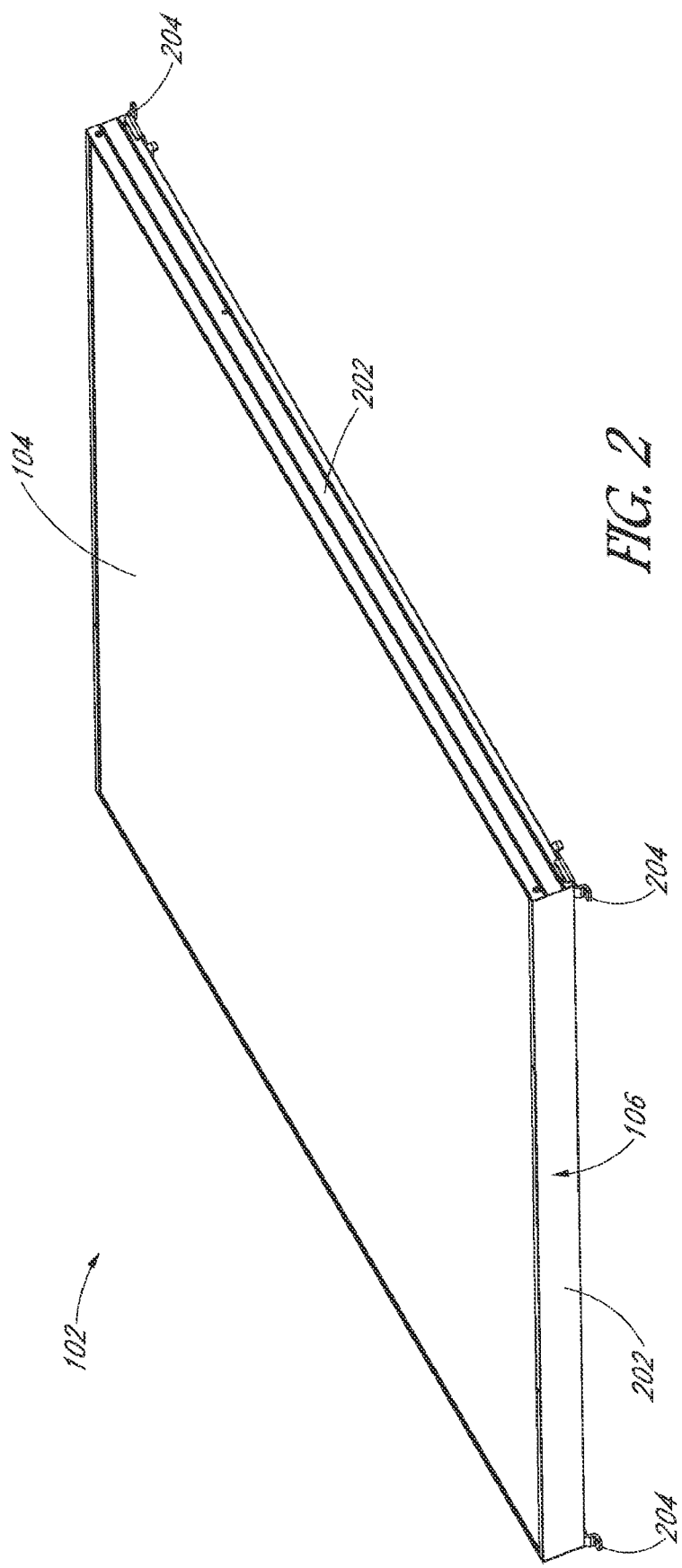
FIG. 2 illustrates a perspective view of a PV module having PV module couplings extending in a longitudinal direction, in accordance with an embodiment of the present disclosure.

Referring to FIG. 2, a perspective view of a PV module having PV module couplings extending in a longitudinal direction is illustrated in accordance with an embodiment of the present disclosure. At least one PV module 102 in PV module system 100 may include PV panel 104 supported by PV module frame 106 having one or more frame rails 202. More particularly, frame rail 202 may be an elongated frame member such as an aluminum extrusion, e.g., T-slotted aluminum extrusions which are known in the art. As such, frame rail 202 may extend straightly from one end of PV panel 104 to another end of PV panel 104 to support the panel along a lateral panel edge. In a case of a rectangular PV panel 104, four frame rails 202 may be joined at four respective corners of PV module frame 106.

PV module frame 106 may include one or more PV module couplings 204 to attach PV module frame 106 to a corresponding mounting chassis 108. In an embodiment, PV module frame 106 includes a respective PV module coupling 204 at each corner. For example, PV module coupling 204 may be fastened to a respective frame corner and include a toe portion extending in the longitudinal direction of frame rail 202 outward and away from the frame corner. The outward extending PV module coupling 204 may therefore engage with a receiver portion of the corresponding mounting chassis 108, as described below.

Figure 3:
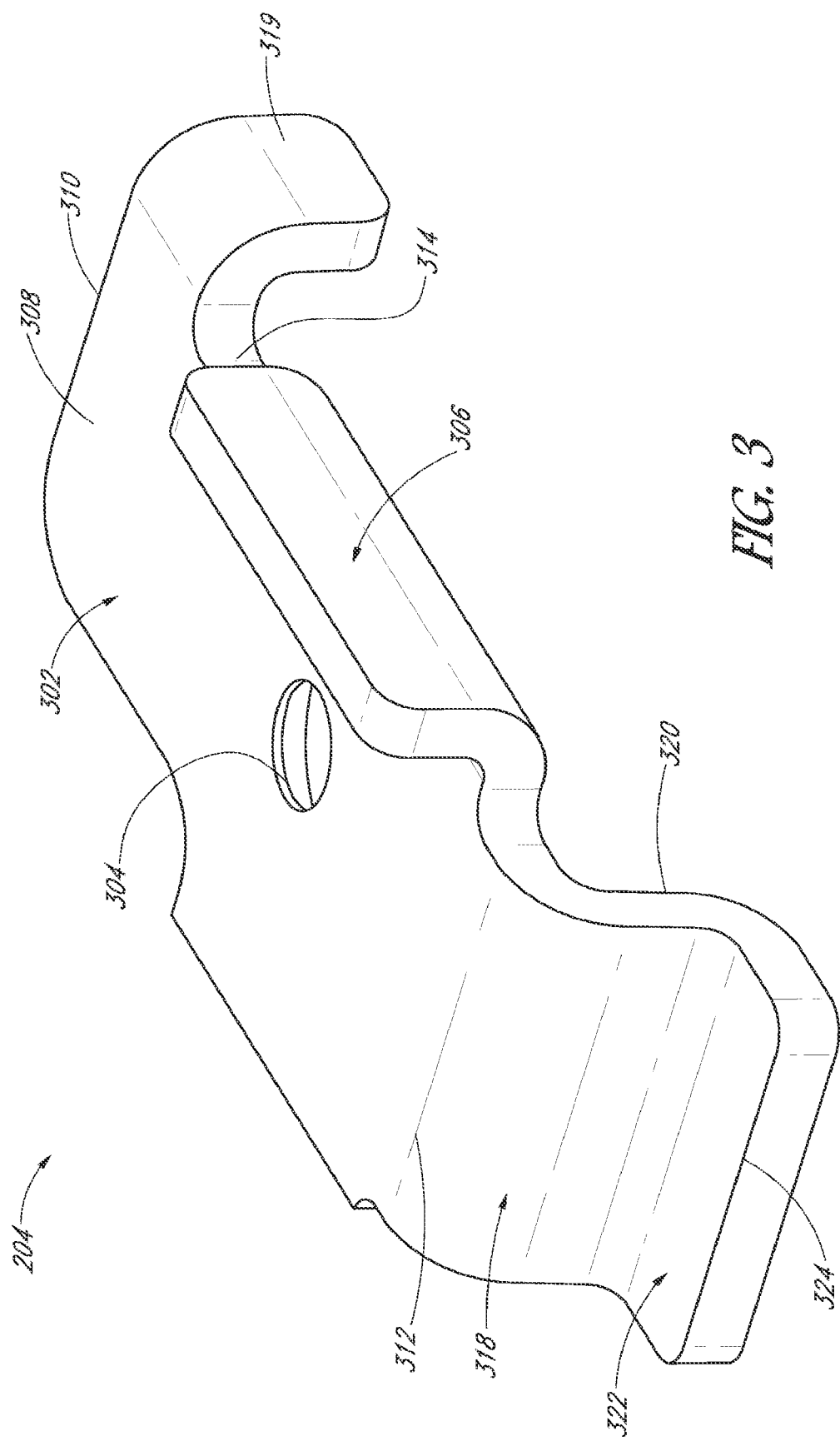
FIG. 3 illustrates a perspective view of a PV module coupling, in accordance with an embodiment of the present disclosure.

Referring to FIG. 3, a perspective view of a PV module coupling is illustrated in accordance with an embodiment of the present disclosure. PV module coupling 204 may include several portions configured to facilitate various functions. For example, PV module coupling 204 may include a body plate 302, a port 304, and a first alignment tab 306 to facilitate alignment with, and attachment to, PV module frame 106.

Body plate 302 may include a flat portion of PV module coupling 204 having an upper surface 308 extending along a first plane between a first plate end 310 and a second plate end 312. The flatness of upper surface 308 may allow body plate 302 to sit flush against an underside of frame rail 202, thereby creating a reference plane from which other portions of PV module coupling 204 may extend to accomplish their respective functionality. For example, upper surface 308 may extend between a first sidewall 314 and a second sidewall (hidden behind body plate 302 in FIG. 3), and first alignment tab 306 may extend upward from first sidewall 314 of body plate 302. More particularly, first alignment tab 306 may extend laterally outward from first sidewall 314 and then curve upward along a plane orthogonal to the reference plane established by upper surface 308. As such, when PV module coupling 204 is attached to a frame corner of PV module 102, upper surface 308 may be flush with an underside of frame rail 202 and first alignment tab 306 may be flush with a side surface of frame rail 202 to accurately locate PV module coupling 204 at the corner of PV module frame 106.

Whereas first alignment tab 306 may align PV module coupling 204 with PV module frame 106, other features of PV module coupling 204 may fasten PV module coupling 204 to PV module frame 106. For example, PV module coupling 204 may include a port 304 through upper surface 308 such that a bolt may pass through port 304 and be threaded into corner ports or openings in frame rail 202 to secure PV module coupling 204 to PV module frame 106. Other fasteners may be used instead of a bolt, e.g., a rivet may be inserted through port 304 to attach PV module coupling 204 to PV module frame 106.

PV module coupling 204 may include portions to locate and/or align PV module frame 106, to which PV module coupling 204 is attached, with another PV module 102. PV module coupling 204 may also be referred to as a locating clip to reflect this locating function. For example, PV module couplings 204 at each corner of PV module frame 106 may include retention features that extend down and around another PV module 102 on which PV module 102 is stacked. In an embodiment, PV module coupling 204 includes a retainer 318 extending downward from second plate end. Retainer 318 may extend downward from PV module frame 106 along a second plane orthogonal to the reference plane established by upper surface 308, and thus, a retention surface 320 on an inward face of retainer 318 may face a corresponding frame rail of the PV module stacked below PV module 102 having PV module coupling 204.

PV module coupling 204 may include several retainer portions to maintain alignment between stacked PV modules. In an embodiment, PV module coupling 204 includes a lateral retainer 319 extending downward from first sidewall 314 of body plate 302. Like retainer 318, lateral retainer 319 may extend downward along a plane orthogonal to upper surface 308. Furthermore, retainer 318 and lateral retainer 319 may be laterally offset from side surfaces of frame rail 202 such that lateral retainer 319 extends downward along a side surface of a PV module stacked below frame rail 202. Lateral retainer 319 may include an inward facing surface to face a corresponding frame rail of the PV module stacked below PV module 102 having PV module coupling 204.

PV module coupling 204 may include a toe 322 portion extending outward from retainer 318 to a terminal edge 324. More particularly, toe 322 may include a tongue portion having an upper face extending between a first edge nearer to second plate end the terminal edge 324. Toe 322 may extend along a plane orthogonal to retention surface 320. Thus, when PV module coupling 204 is attached to a corner of PV module frame 106, toe 322 may extend longitudinally outward from an end of frame rail 202.

PV module coupling 204 may be formed in a variety of materials, including metals and plastics. In an embodiment, one or more PV module coupling 204 attached to PV module frame 106 may be fabricated at least partially from stainless steel. Stainless steel is known to provide good electrical grounding properties, and is also weather resistant. Such properties contribute to the function of the mounting components described herein.

Figure 4:
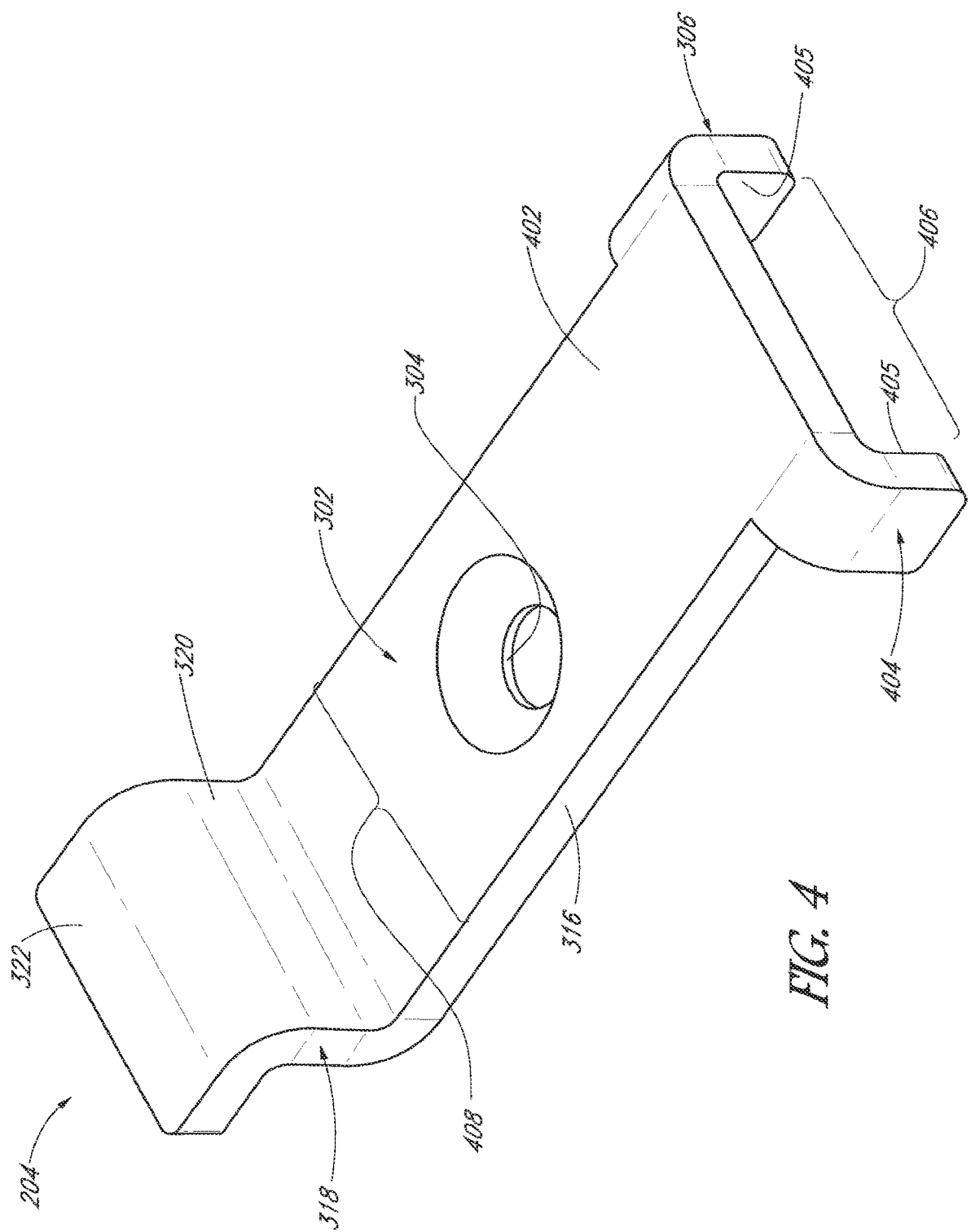
FIG. 4 illustrates a perspective view of a PV module coupling, in accordance with an embodiment of the present disclosure.

Referring to FIG. 4, a perspective view of a PV module coupling is illustrated in accordance with an embodiment of the present disclosure. PV module coupling 204 shown in FIG. 4 shares some features in common with PV module coupling 204 shown in FIG. 3. For example, PV module coupling 204 of FIG. 4 includes body plate 302, retainer 318, and toe 322, which extends in a longitudinal direction. Furthermore, retention surface 320 of retainer 318 faces inward toward a vertical axis passing through port 304. Additional features of PV module coupling 204, however, can be seen in FIG. 4. For example, a bottom surface 402 of body plate 302 may face an opposite direction from PV module coupling 204 than upper surface 308 (PV module coupling 204 is viewed in an upward direction in FIG. 4, as opposed to a downward direction as viewed in FIG. 3). Furthermore, port 304 may be a countersunk opening to allow the head of a fastener (e.g., a screw) to be recessed such that a top of the fastener head is flush with bottom surface 402, and bottom surface 402 can be stacked flush on a corresponding PV module frame 106.

In an embodiment, PV module coupling 204 includes several alignment tabs to wrap around frame rail 202 and align PV module coupling 204 in a transverse direction relative to frame rail 202. For example, in addition to first alignment tab 306, PV module coupling 204 include second alignment tab 404. Second alignment tab 404 may extend upward from second sidewall 316 (second sidewall 316 was hidden in FIG. 3). Thus, the alignment tabs may include respective inward surfaces 405 facing each other laterally across upper surface 308 of body plate 302. One or more of the alignment tabs may extend outward from a respective sidewall such that a separation 406 between the inward surfaces 405 includes a distance greater than a width 408 of upper surface 308 and/or bottom surface 402. More particularly, the separation 406 distance may be wider than a width of frame rail 202 such that the alignment tabs may cradle frame rail 202 to prevent lateral movement of PV module coupling 204 relative to frame rail 202.

As shown in FIGS. 3-4, PV module coupling 204 may be a monolithically formed component. For example, body plate 302, retainer 318, and toe 322 may be segments of a singular body. The geometry of PV module coupling 204 may be achieved, for example, by bending sheet metal into the illustrated structure. Alternatively, a single blank of material may be milled and/or machined into the illustrated structure. In an embodiment, one or more of the PV module couplings 204 attached to PV module frame 106 may be cast metal or injection molded plastic.

In an embodiment, PV module coupling 204 include several separate components assembled into a single component. For example, body plate 302 may be a single flat plate having port 304 formed through it. Retention features such as retainer 318 and first alignment tab 306 may include pins or pegs pressed into body plate 302 and extending in the directions and at the locations described above. Thus, the structures as shown in FIGS. 3-4 are provided by way of example and not limitation.

Figure 5:
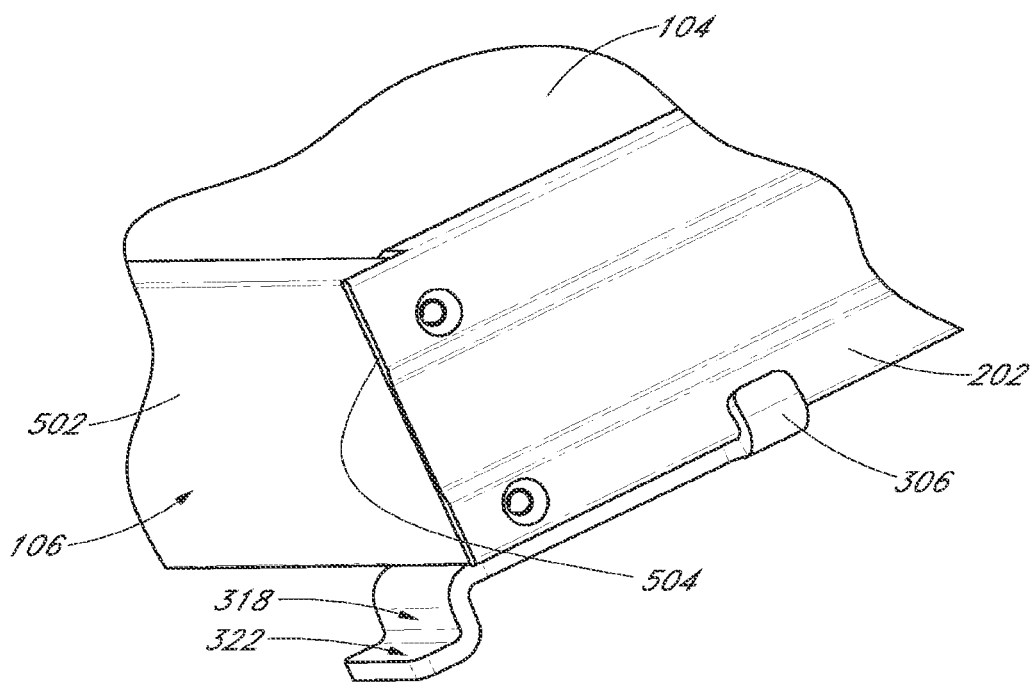
FIG. 5 illustrates a perspective view of a PV module frame having a toe of a PV module coupling extending in a longitudinal direction, in accordance with an embodiment of the present disclosure.

Referring to FIG. 5, a perspective view of a PV module frame having a toe of a PV module coupling extending in a longitudinal direction is illustrated in accordance with an embodiment of the present disclosure. PV module frame 106 may include side frame rail 202 connected with an end rail 502 (a type of frame rail 202 extending along a transverse upper or lower edge of PV panel 104) at a frame rail end 504 at a frame corner. Thus, frame rail 202 and end rail 502 may support PV panel 104 along its transverse and lateral edges.

PV module coupling 204 may be attached to frame rail 202 and/or end rail 502 at the frame corner, and first alignment tab 306 may extend upward along a side of frame rail 202 with the inward surface 405 of first alignment tab 306 facing a side surface of frame rail 202. Furthermore, as described above, retainer 318 of PV module coupling 204 may extend downward from the corner of PV module frame 106, and toe 322 may extend in the longitudinal direction, i.e., a direction parallel to frame rail 202 and a lateral edge of PV panel 104, away from frame rail end 504.

Figure 6:
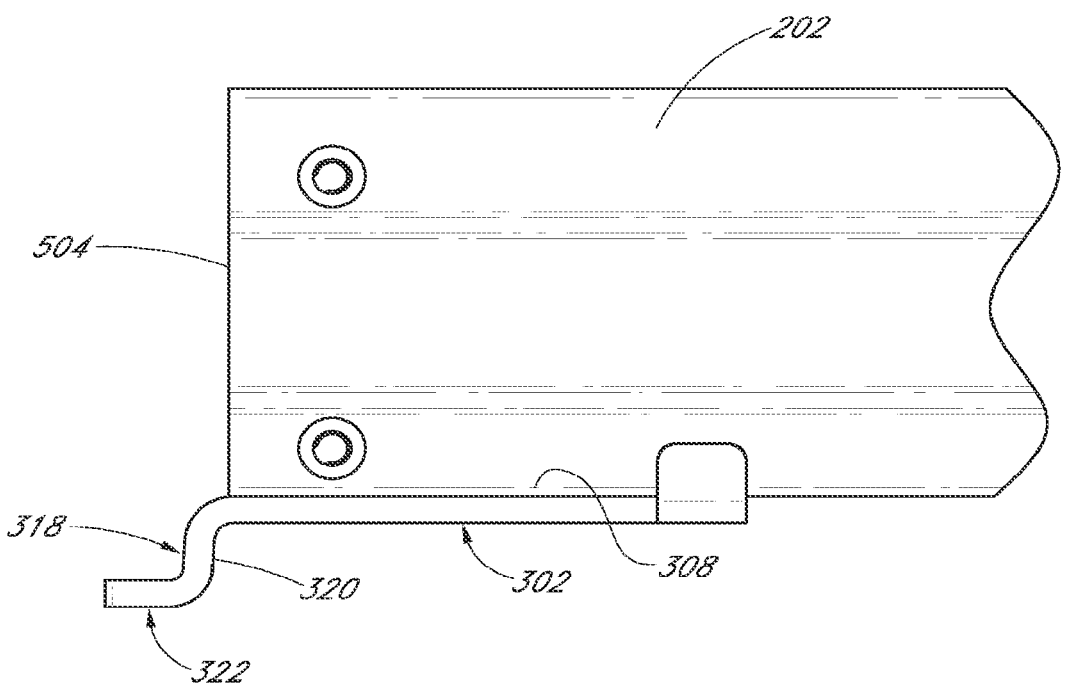
FIG. 6 illustrates a side view of PV module frame having a toe of a PV module coupling extending in a longitudinal direction, in accordance with an embodiment of the present disclosure.

Referring to FIG. 6, a side view of PV module frame having a toe of a PV module coupling extending in a longitudinal direction is illustrated in accordance with an embodiment of the present disclosure. Upper surface 308 of body plate 302 may be flush with a lower surface of frame rail 202. Furthermore, retention surface 320 of retainer 318 may extend downward along a plane orthogonal to the lower surface of frame rail 202. Thus, retention surface 320 may be parallel to a surface extending upward along frame rail end 504.

Figure 7:
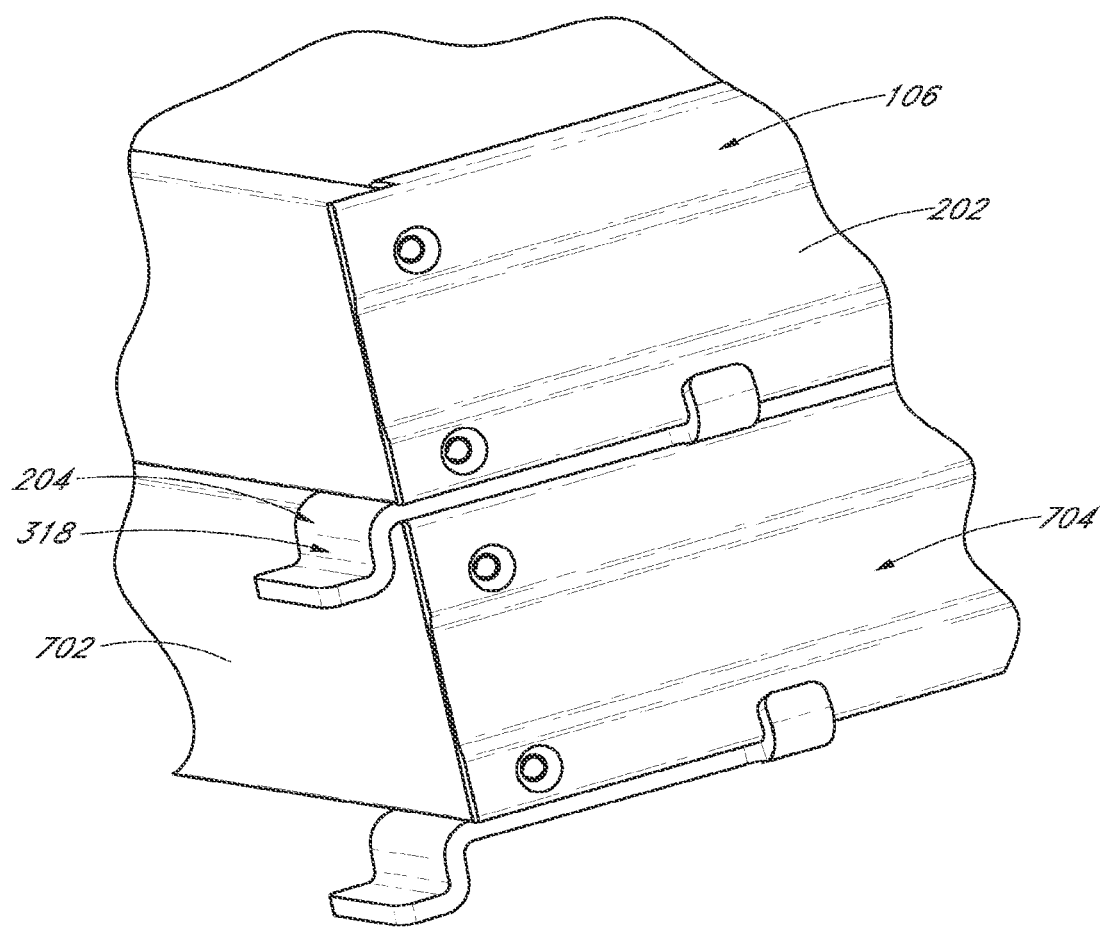
FIG. 7 illustrates a perspective view of stacked PV modules having toes of respective PV module couplings extending in a longitudinal direction, in accordance with an embodiment of the present disclosure.

Referring to FIG. 7, a perspective view of stacked PV modules having toes of respective PV module couplings extending in a longitudinal direction is illustrated in accordance with an embodiment of the present disclosure. Retainer 318 of PV module coupling 204 may extend downward from frame rail 202 such that an inward facing retention surface 320 is directed toward a mating end rail 702 of a lower PV module frame 704. More particularly, when PV module frame 106 is stacked on lower PV module frame 704, retainer 318 may register against and/or abut mating end rail 702 to prevent longitudinal relative movement between the stacked PV modules. Accordingly, a PV module frame 106 having a PV module coupling 204 allows several PV modules to be efficiently and securely stacked for transportation to an installation site. While FIGS. 5-7 show the PV module coupling 204 disclosed in FIG. 4, it will be understood that the PV module coupling 204 disclosed in FIG. 3 could be used instead.

Figure 8:
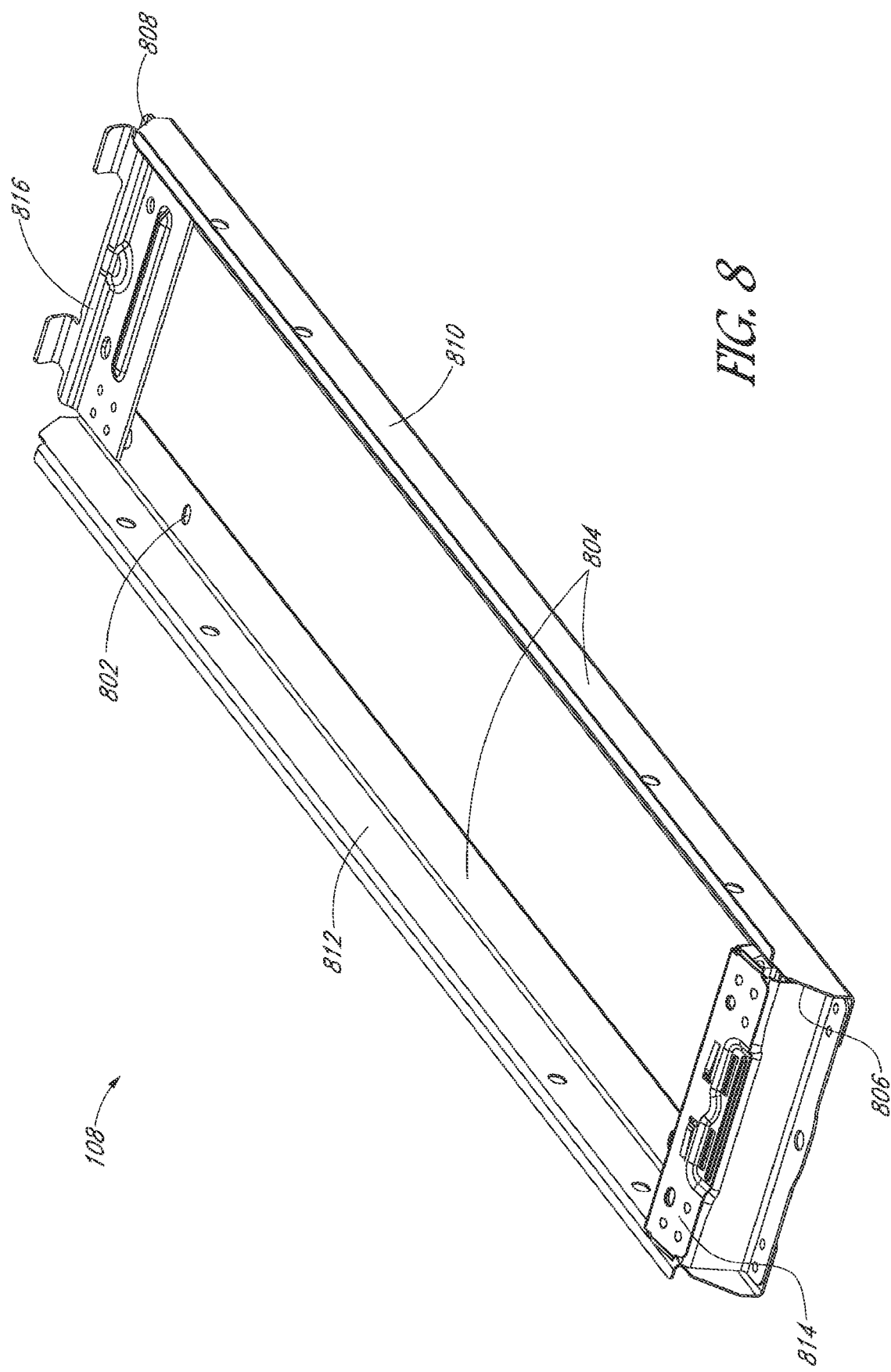
FIG. 8 illustrates a perspective view of a mounting chassis, in accordance with an embodiment of the present disclosure.

Referring to FIG. 8, a perspective view of a mounting chassis is illustrated in accordance with an embodiment of the present disclosure. Mounting chassis 108 may be configured to physically connect with other structures of PV module system 100. For example, mounting chassis 108 may receive PV module coupling 204 attached to PV module frame 106 to physically connect with PV module 102. Similarly, mounting chassis 108 may receive an adjacent mounting chassis 108 used to connect to a different PV module 102 of PV module system 100. Furthermore, mounting chassis 108 may connect to an external structure or support surface, e.g., a roof, the top of a carport, etc. By way of example, mounting chassis 108 may include one or more attachment openings 802 to receive a screw or other fastener that may be affixed to the roof. Thus, mounting chassis 108 may be a segment of an overall mounting frame used to orient and locate PV modules 102 relative to the roof.

In an embodiment, mounting chassis 108 includes one or more bridging member 804 having an elongated body extending between a first member end 806 and a second member end 808. For example, bridging member 804 may include a pair of rails, i.e., a first rail 810 and a second rail 812, that extend between first member end 806 and second member end 808. The rails may include bent sheet metal having L-shaped cross-sections, as shown. Various openings may be formed through the rails to allow other components of mounting chassis 108 to be attached thereto.

The components that attach to respective ends of bridging member 804 may be varied according to the function that the respective end is intended to achieve within the greater PV module system 100. For example, a grounding plate 814 may be a functional component attached to bridging member 804 at first member end 806 to receive a southernmost edge of a corresponding PV module 102, and to provide an electrical ground connection between bridging member 804 and the corresponding PV module 102. Accordingly, grounding plate 814 may be affixed to bridging member 804 and may extend between first rail 810 and second rail 812 at first member end 806. Similarly, a tab plate 816 may be a functional component attached to bridging member 804 at second member end 808 to receive an adjacent mounting chassis and to maintain a relative position between the adjacent mounting chassis (and a corresponding PV module 102 mounted on the adjacent mounting chassis) and PV module 102 received by grounding plate 814 of mounting chassis 108. Accordingly, tab plate 816 may be affixed to bridging member 804 and may extend between first rail 810 and second rail 812 at second end.

Figure 9:
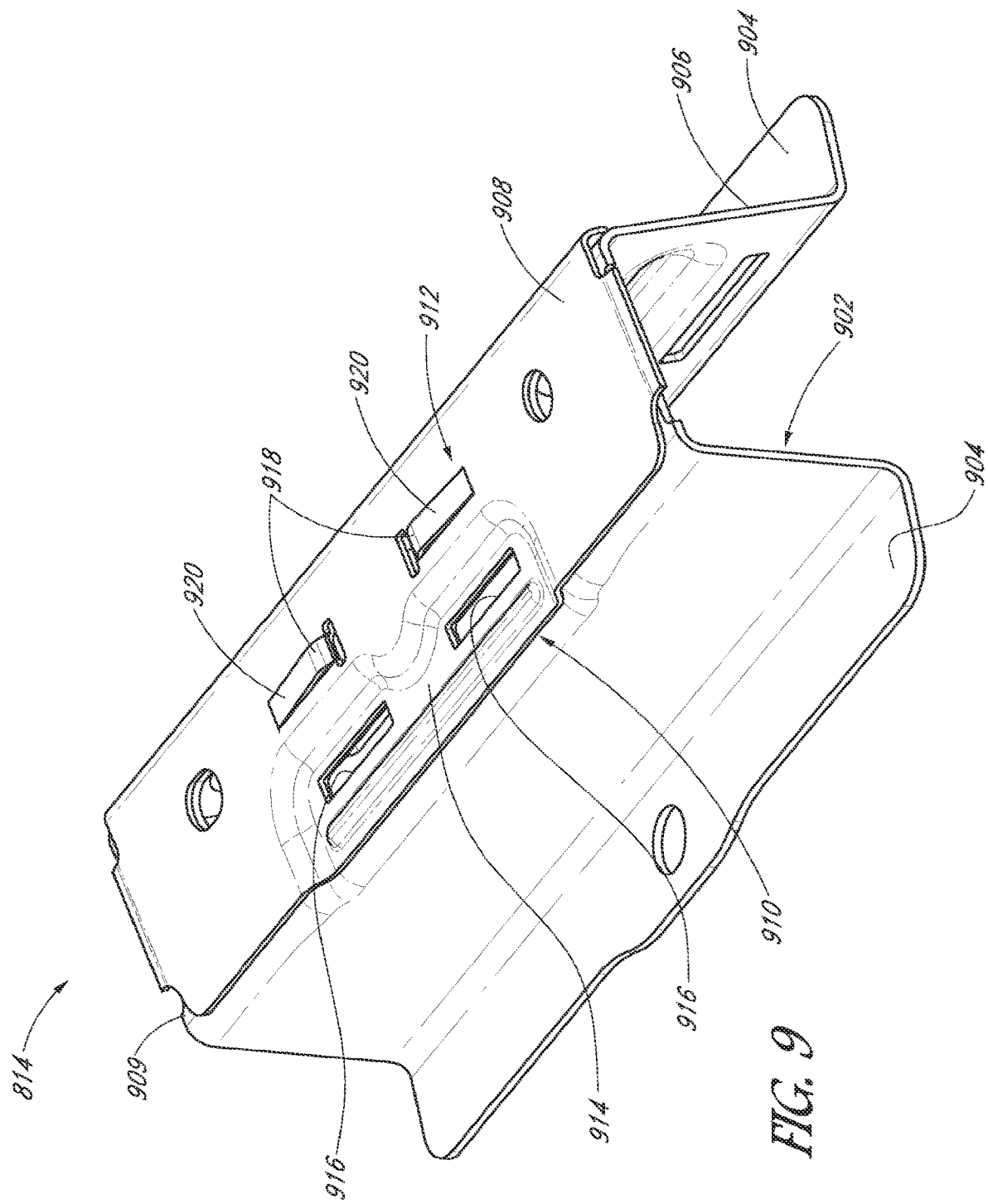
FIG. 9 illustrates a perspective view of a grounding plate of a mounting chassis, in accordance with an embodiment of the present disclosure.

Referring to FIG. 9, a perspective view of a grounding plate of a mounting chassis is illustrated in accordance with an embodiment of the present disclosure. Although grounding plate 814 may be formed from a single piece of material, in an embodiment, grounding plate 814 includes several subcomponents. For example, grounding plate 814 may include a grounding base 902 having a base plate 904 and one or more base sides 906 extending upward from base plate 904 to a base top 909. Accordingly, base plate 904 may be attached to bridging member 804 at a same level of the external structure, e.g., the roof, and base top 909 may be held above the roof at a height of several inches. Grounding base 902 may be fabricated from bent sheet metal to provide a stable support having a necessary height, and with minimal material costs.

Grounding plate 814 may also include a grounding cap 908, which may be secured to base top 909. Grounding cap 908 may be supported above the roof by grounding base 902. Grounding cap 908 may include a toe receiving portion 910 to receive a toe 322 portion of a corresponding PV module coupling 204, and a contact portion 912 to provide a grounding connection between the corresponding PV module coupling 204 and bridging member 804.

In an embodiment, toe receiving portion 910 includes an upper receiving surface 914 facing away from base plate 904, i.e., facing upward and away from a roof on which mounting chassis 108 is mounted. Upper receiving surface 914 may include one or more toe 322 slot, such as a pair of upper toe slots 916. Upper toe slot 916 may be stamped, milled, or cut through upper receiving surface 914 to provide a slot within which toe 322 of PV module coupling 204 may be inserted.

Upper toe slot 916 may be sized to receive a corresponding toe 322 portion of PV module coupling 204 and to accommodate thermal expansion of the frame components. More particularly, upper toe slot 916 may have a geometry matching a cross-sectional shape of the toe 322 portion, e.g., both upper toe slot 916 and the toe 322 portion may have rectangular profiles. Furthermore, a width and/or height dimension of upper toe slot 916 may be larger than a corresponding width 408 and/or height of the toe 322 portion. In an embodiment, a dimension of upper toe slot 916 may be at least 2 mm larger, e.g., 3 mm larger, than the corresponding dimension of the toe 322 portion. Accordingly, upper toe slot 916 may be large enough to receive the toe 322 portion when PV module frame 106 is in a first orientation. However, as described below, upper toe slot 916 may be too small to allow the toe 322 portion to be removed when PV module frame 106 is pivoted into a second orientation.

Base top 909 and/or a top surface of grounding cap 908 may be angled relative to base plate 904 to generally conform to a tilt angle of frame rail 202, e.g., when frame rail 202 is tilted to direct PV panel 104 toward the sun. Thus, contact portion 912 may include a contact surface 918 that is vertically higher than upper receiving surface 914. Accordingly, when toe 322 of a corresponding PV module coupling 204 is inserted into upper toe slot 916, bottom surface 402 of the corresponding PV module coupling 204 may be placed in physical contact with contact surface 918. As such, frame rail 202 of the corresponding PV module 102, which may be physically and electrically connected to the corresponding PV module coupling 204, may be placed in electrical contact with bridging member 804 through contact surface 918. More particularly, contact surface 918 may be electrically connected to second member end 808 through grounding cap 908, grounding base 902, and one or more of first rail 810 or second rail 812.

In an embodiment, contact portion 912 includes a spring contact 920 having contact surface 918. More particularly, spring contact 920 may include a resiliently deflectable tab, bump, pin, or other structure configured to extend above the top surface of grounding cap 908. When pressed downward, such as when pressed by a corresponding PV module coupling 204, contact surface 918 on spring contact 920 may deflect downward, however, spring contact 920 may exert an opposing force on the corresponding PV module coupling 204 to maintain a secure physical and electrical connection between the components. More particularly, spring contact 920 may have enough resilience to follow the corresponding PV module coupling 204 when the PV module 102 moves under external loading, e.g., wind loading. Thus, spring contact 920 may provide a reliable grounding connection through the frame components.

Figure 10:
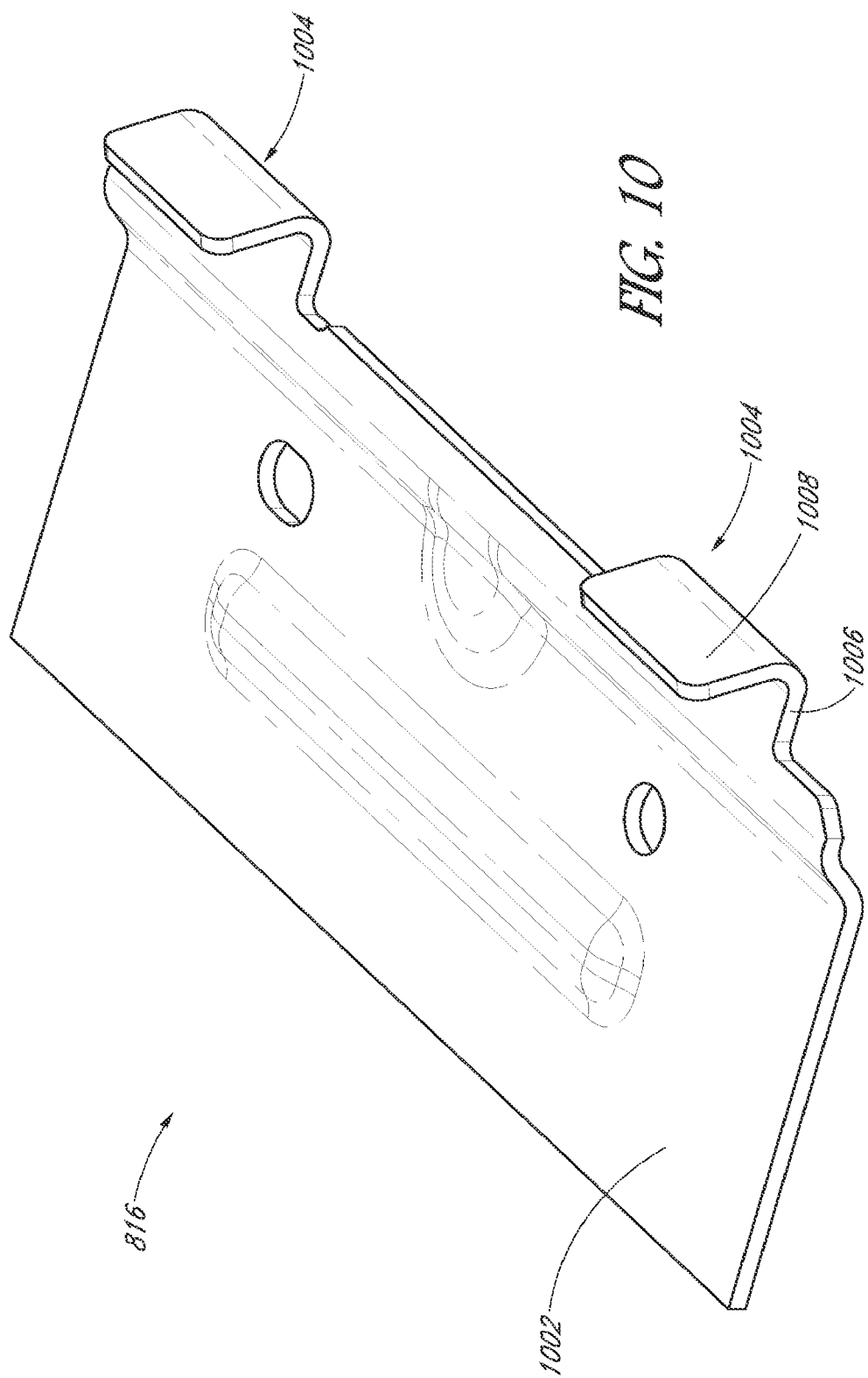
FIG. 10 illustrates a perspective view of a tab plate of a mounting chassis, in accordance with an embodiment of the disclosure.

Referring to FIG. 10, a perspective view of a tab plate of a mounting chassis is illustrated in accordance with an embodiment of the disclosure. Tab plate 816 may include a tab base 1002. Tab base 1002 may attach to bridging member 804 at a same level as an external structure or support surface, e.g., a roof. In an embodiment, tab base 1002 extends between first rail 810 and second rail 812. Tab plate 816 may include one or more tab portions extending from tab base 1002. For example, one or more hook tab 1004 may extend from tab base 1002 to engage with a corresponding slot in an adjacent module chassis, similar to the manner in which toe 322 of PV module coupling 204 engages upper toe slot 916 of grounding plate 814. Hook tab 1004 may include a tab shank portion 1006 extending along a plane parallel to a top surface of tab base 1002, and a vertical tab portion 1008 extending vertically upward from tab shank portion 1006. Hook tab 1004 represents only one potential embodiment of tabs that extend from tab base 1002 to allow for a toe and slot construction as described herein. For example, in an embodiment, a tab may extend from tab base 1002 to a terminal edge in a horizontal direction. That is, the tab may have an upper surface parallel to an upper surface of tab base 1002, without including a hooked portion.

Figure 11:
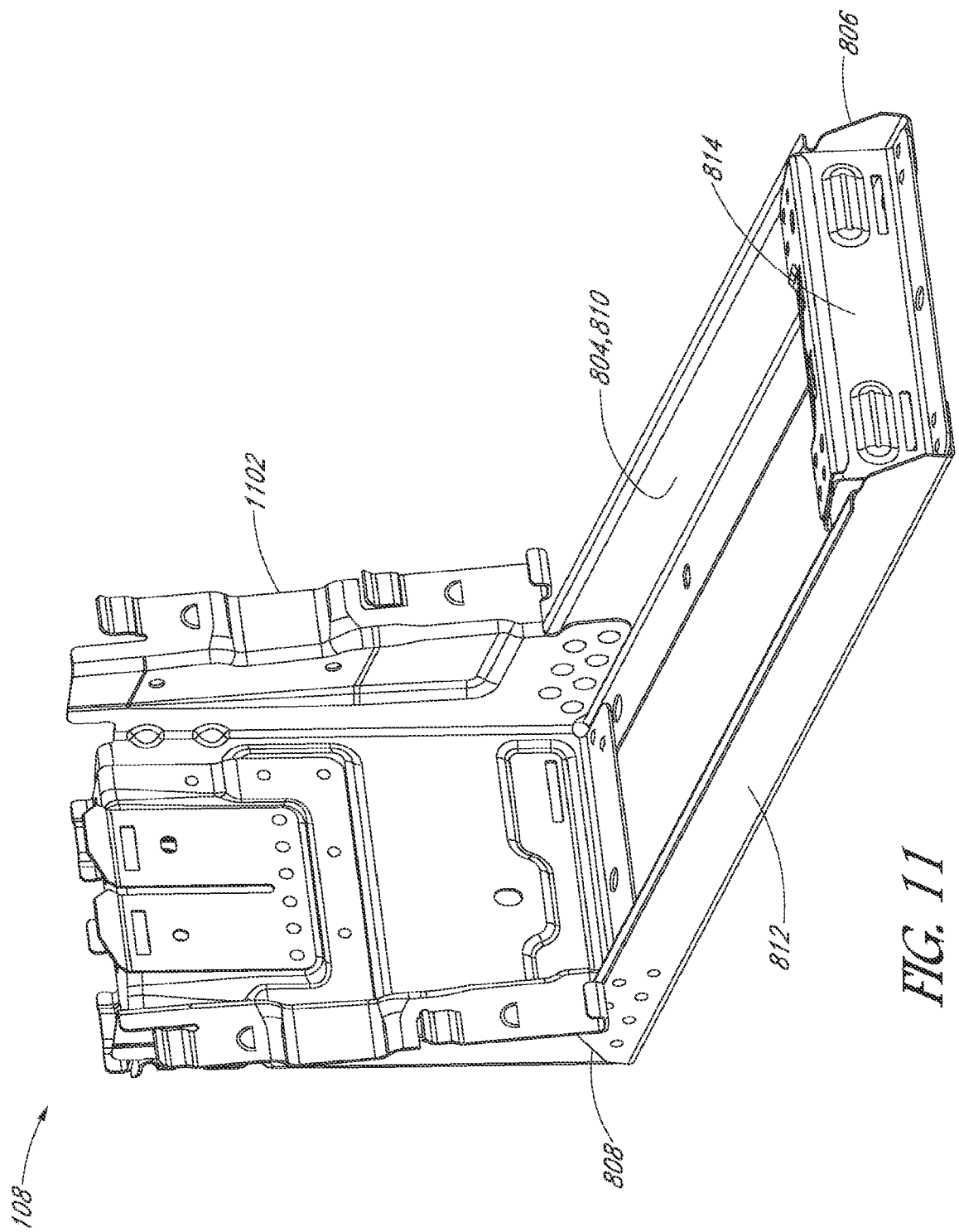
FIG. 11 illustrates a perspective view of a mounting chassis, in accordance with an embodiment of the disclosure.

Referring to FIG. 11, a perspective view of a mounting chassis is illustrated in accordance with an embodiment of the disclosure. Mounting chassis 108 may include a different combination of bridging member 804 and functional end component portions. For example, whereas mounting chassis 108 shown in FIG. 11 may include grounding plate 814 attached to bridging member 804 at first member end 806, similar to mounting chassis 108 described above, mounting chassis 108 of FIG. 11 may include a module stand 1102 at second member end 808, instead of tab plate 816. More particularly, module stand 1102 may be affixed to first rail 810 and/or second rail 812 at second member end 808.

Figure 12:
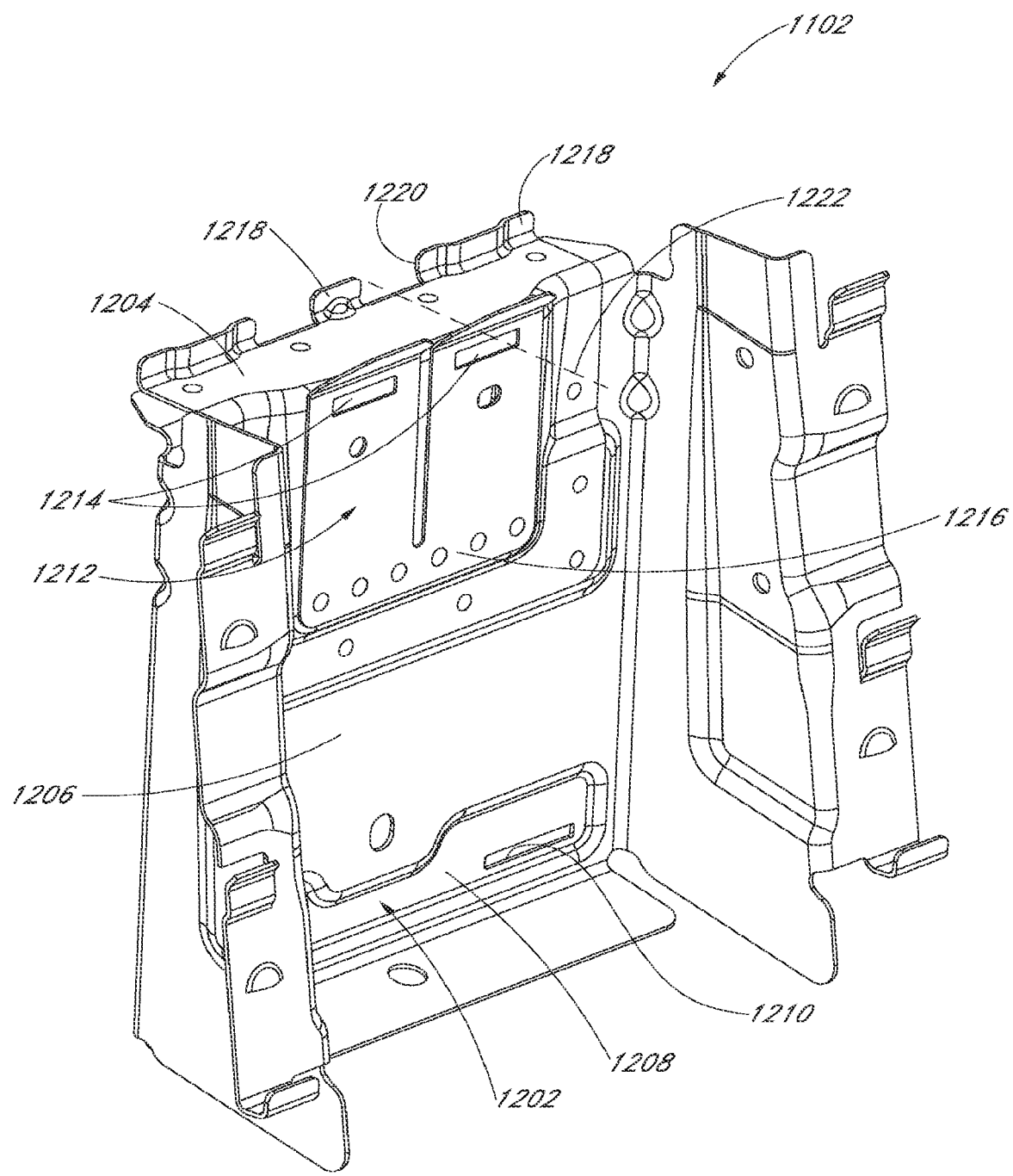
FIG. 12 illustrates a perspective view of a module stand of a mounting chassis, in accordance with an embodiment of the disclosure.

Referring to FIG. 12, a perspective view of a module stand of a mounting chassis is illustrated in accordance with an embodiment of the disclosure. Module stand 1102 may include a base portion 1202 in a lower region. For example, base portion 1202 may extend between the pair of first rail 810 and second rail 812 at second member end 808. Base portion 1202 may include a side receiving surface 1208 facing a horizontal direction, i.e., in the direction that first rail 810 extends away from module stand 1102. One or more side toe 322 slot may be formed through side receiving surface 1208. Thus, side toe slot 1210 may be located to receive hook tab 1004 extending from a tab plate 816 of an adjacent mounting chassis. Side toe slot 1210 may be longitudinally aligned with upper toe slot 916 of grounding plate 814 and/or hook tab 1004 of tab plate 816 located at first member end 806 of mounting chassis 108.

In an embodiment, module stand 1102 includes a support surface 1204 above base portion 1202. More particularly, module stand 1102 may include an upright 1206 extending from base portion 1202 to support surface 1204, and base portion 1202 may support upright 1206, which in turn supports support surface 1204. Thus, frame rail 202 of a PV module 102 may rest on support surface 1204 at a location higher than an installation surface, e.g., a roof, such that the PV module 102 is held in a tilted orientation. For example, the PV module 102 may be held at a five degree angle relative to the installation surface. Of course, the PV module 102 may be held at other orientations (e.g., between one degree and ten degrees) relative to the installation surface.

Figure 13:
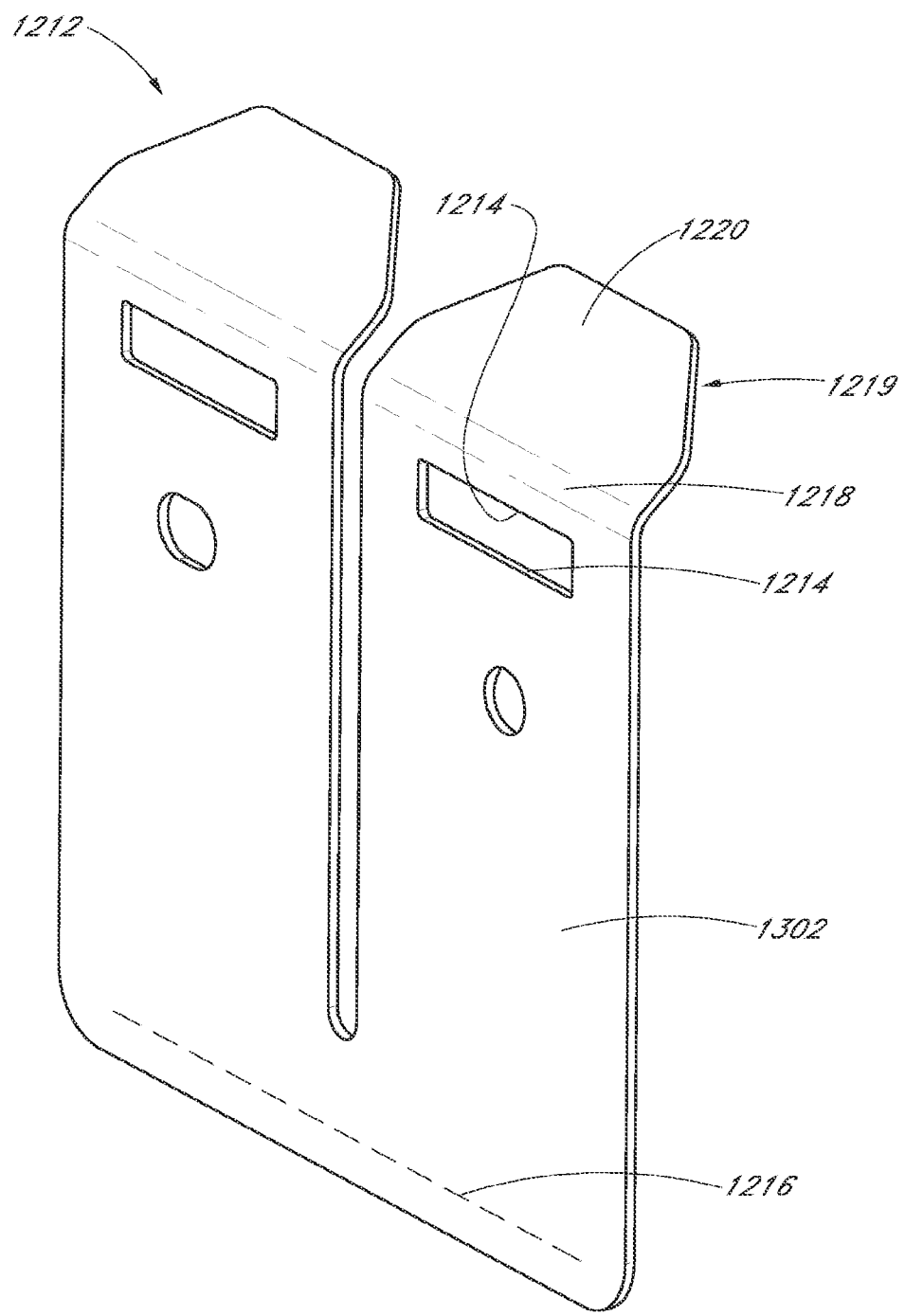
FIG. 13 illustrates a perspective view of a locking plate of a mounting chassis, in accordance with an embodiment of the disclosure.

In addition to supporting PV module 102, module stand 1102 may retain PV module 102 to resist removal forces imposed by external loading, e.g., wind loading. To this end, module stand 1102 may include a locking plate 1212 configured to engage a toe portion extending from PV module 102 and to retain the toe 322 under external loading. Locking plate 1212 may include one or more locking toe slot 1214 through a locking surface 1302 (FIG. 13). The locking surface 1302 may be orthogonal to support surface 1204 such that toe 322 of PV module coupling 204, which extends longitudinally away from frame rail 202, can insert through locking toe slot 1214.

In an embodiment, locking plate 1212 is attached to upright 1206 at a hinge point 1216. For example, locking plate 1212 may be welded or riveted to upright 1206 at hinge point 1216 such that a lower edge of locking plate 1212 remains fixed relative to module stand 1102 and an upper portion of locking plate 1212, e.g., a region having locking toe slot 1214, can be cantilevered away from upright 1206.

Referring to FIG. 13, a perspective view of a locking plate of a module stand is illustrated in accordance with an embodiment of the disclosure. A locking surface 1302 of locking plate 1212 may be a surface facing upright 1206 and/or support surface 1204 of module stand 1102. Thus, in an embodiment locking surface 1302 is attached to upright 1206. Furthermore, locking surface 1302 may be attached to upright 1206 at one or more locations, e.g., via threaded fasteners, spot welds, or welded beads, and thus hinge point 1216 may be a discrete location or an extended connection along a line. As such, locking surface 1302 may be resiliently deflectable away from upright 1206 about hinge point 1216.

The structure that allows locking surface 1302 to be resiliently deflected away from upright 1206 is shown in FIG. 13. When locking surface 1302 is not deflected away from upright 1206, locking toe slot 1214 through locking surface 1302 may be located adjacent to upright 1206, i.e., locking surface 1302 may abut upright 1206. In such configuration, locking toe slots 1214 may be located vertically below support surface 1204. Alternatively, locking surface 1302 may extend from hinge point 1216 to an upper locking surface edge 1218 vertically higher than support surface 1204, and locking toe slot 1214 may be vertically above support surface 1204.

In an embodiment, locking plate 1212 includes a striking panel 1219 having a striking surface 1220 that extends from upper locking surface edge 1218. For example, striking surface 1220 may extend from upper locking surface edge 1218 at an oblique angle to support surface 1204. More particularly, striking surface 1220 may be arranged at an angle to support surface 1204 and/or locking surface 1302, such that when a toe 322 portion of a corresponding PV module 102 is lowered toward striking surface 1220, the impact force of the toe 322 portion on striking surface 1220 has a horizontal component that presses locking plate 1212 outward away from upright 1206. Accordingly, striking surface 1220 facilitates the resilient deflection of locking surface 1302 away from upright 1206 about hinge point 1216.

Referring again to FIG. 12, module stand may optionally include features to maintain alignment between module chassis and a corresponding PV module. For example, one or more alignment protrusions 1218 may extend upward from support surface 1204 at laterally offset locations. More particularly, a pair of alignment protrusions 1218 may be laterally offset by a distance greater than a width of frame rail 202 to form a rail notch 1220 within which frame rail 202 may be received by module stand 1102. Thus, rail notch 1220 may be defined between the pair of alignment protrusions 1218, and above support surface 1204. In an embodiment, rail notch 1220 is longitudinally aligned with locking toe slot 1214 in locking plate 1212. That is, a notch/slot alignment reference 1222 line or plane extending in a longitudinal direction may pass through locking toe slot 1214 and rail notch 1220. Accordingly, frame rail 202 of a corresponding PV module 102 may fit within rail notch 1220 and a toe 322 portion extending longitudinally away from the frame rail 202 may be aligned with, and may engage, locking toe slot 1214. Similarly, locking toe slot 1214 may be longitudinally aligned with upper toe slot 916 in grounding plate 814 on either the same mounting chassis 108 or an adjacent mounting chassis. In each case, the longitudinally aligned slots and/or notches may be located laterally between the pairs of rails making up corresponding bridging members 804.

Figure 14:
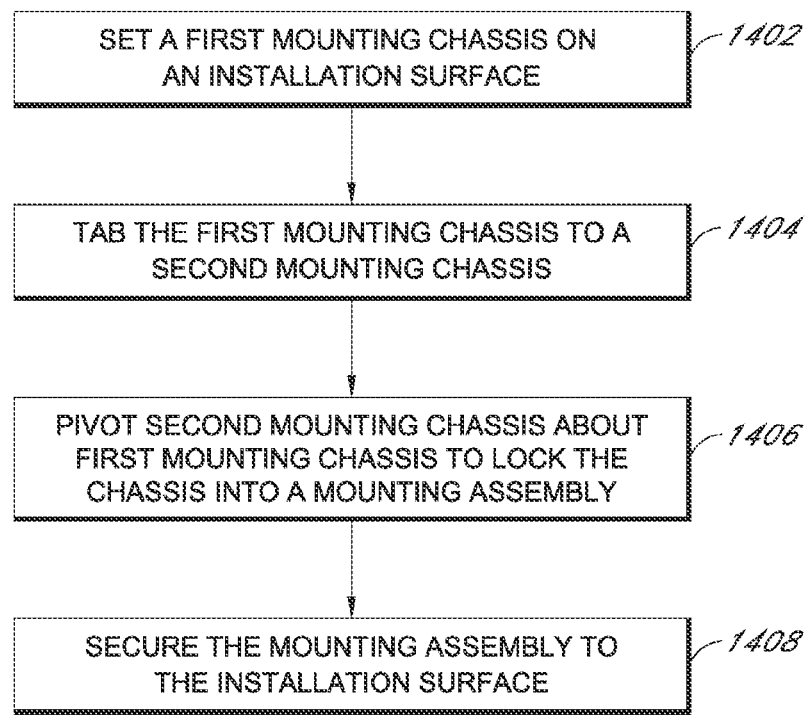
FIG. 14 provides a flowchart of a method of assembling several mounting chassis into a mounting assembly, in accordance with an embodiment of the disclosure.

Referring to FIG. 14, a flowchart of a method of assembling several mounting chassis into a mounting assembly is provided in accordance with an embodiment of the disclosure. Operations of the method are pictorially illustrated in FIGS. 15A-15D, and thus, the numbered operations of FIG. 14 shall be described below in relation to the corresponding pictorial illustrations.

Figure 15A:
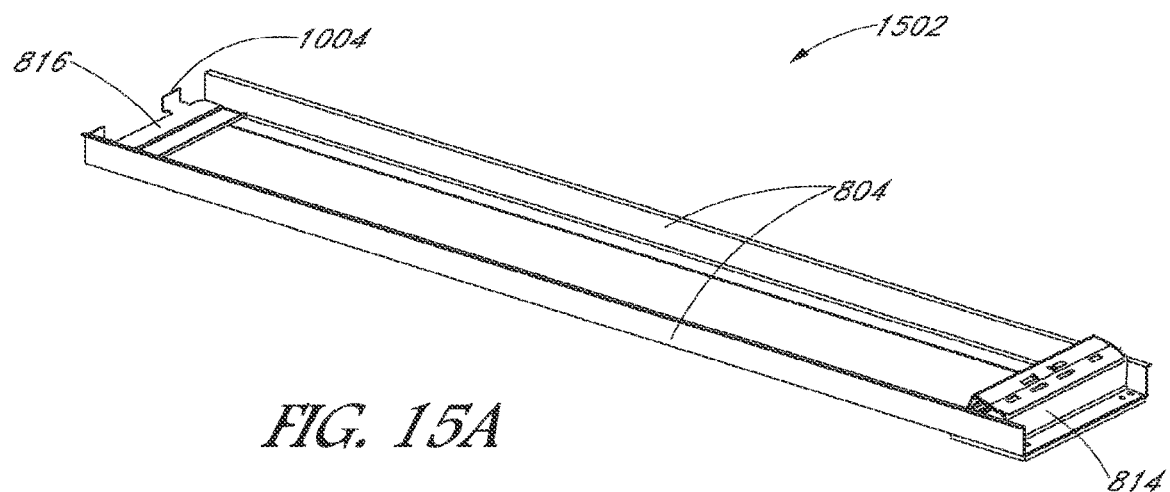
FIGS. 15A-15D illustrate perspective views of various operations in a method of assembling several mounting chassis into a mounting assembly, in accordance with an embodiment of the disclosure.

Referring to FIG. 15A, at operation 1402, a first mounting chassis 1502 is set on an installation surface. First mounting chassis 1502 may include a construction as described above with respect to FIG. 8. That is, first mounting chassis 1502 may include grounding plate 814 and tab plate 816 at respective ends of bridging member 804.

Figure 15B:
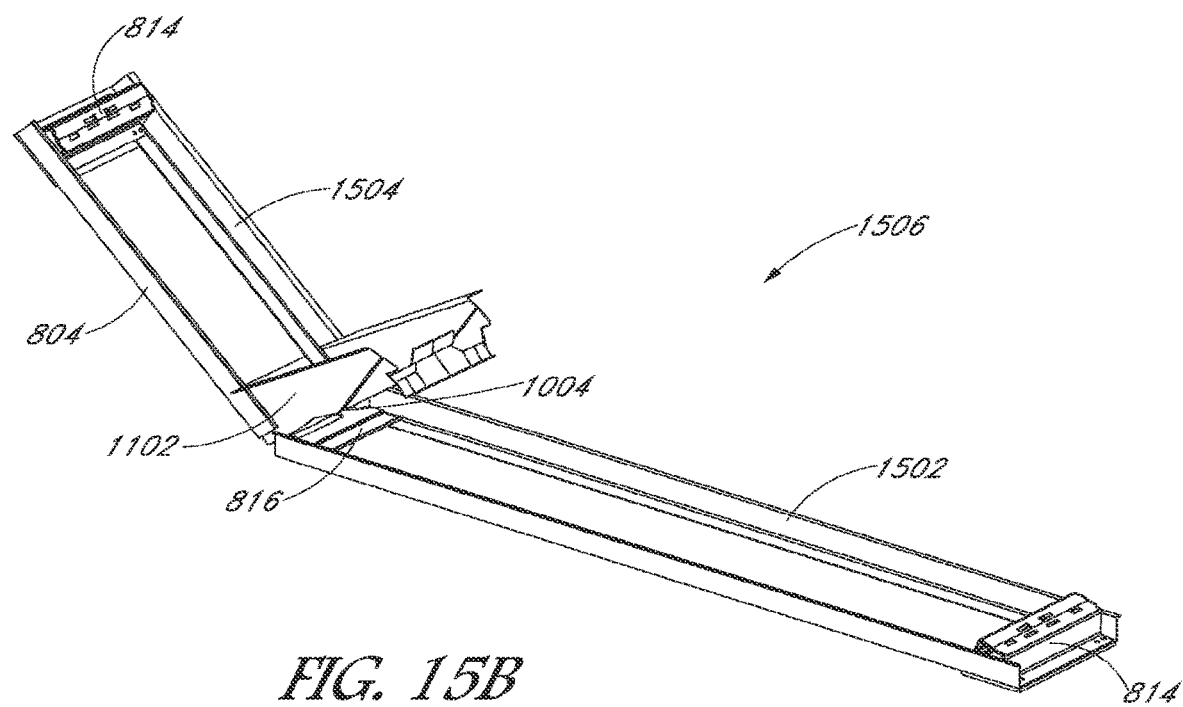

Referring to FIG. 15B, at operation 1404, first mounting chassis 1502 may be tabbed to a second mounting chassis 1504 to form a mounting assembly 1506. Mounting assembly 1506 may include any combination of mounting chassis 108. For example, first mounting chassis 1502 may include tab plate 816 and grounding plate 814, as shown, or may include any other combination of functional component ends such as having two tab plates 816. Second mounting chassis 1504 may include a construction as described above with respect to FIG. 11. That is, second mounting chassis 1504 may include grounding plate 814 and module stand 1102 at respective ends of bridging member 804. A functional component at an end of first mounting chassis 1502 may be physically connected to a functional component at an end of second mounting chassis 1504. For example, tab plate 816 of first mounting chassis 1502 may include one or more hook tab 1004 that insert into corresponding side toe slots 1210 in module stand 1102 of second mounting chassis 1504. Since hook tabs 1004 may extend vertically upward from tab plate 816 and side toe slots 1210 may be horizontally directed, second mounting chassis 1504 may be tilted relative to first mounting chassis 1502 to drop the side toe slots 1210 on to the corresponding hook tabs 1004.

Figure 15C:
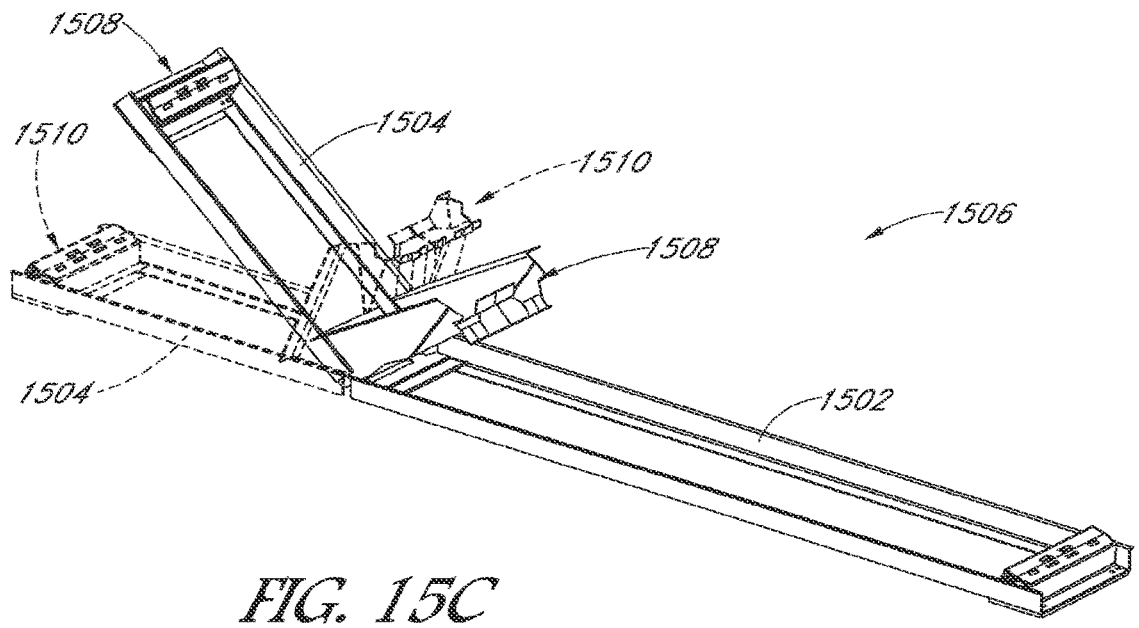

Referring to FIG. 15C, at operation 1406, second mounting chassis 1504 may be pivoted about an end of first mounting chassis 1502 to lock the chassis into place in mounting assembly 1506. For example, side toe slots 1210 of second mounting chassis 1504 may be dropped onto corresponding hook tabs 1004 in an unlocked state 1508, and then pivoted such that the chassis rails are parallel in a locked state 1510. In locked state 1510, hook tabs 1004 of first chassis extend around base portion 1202 of second mounting chassis 1504 such that a longitudinal force causes vertical tab portion 1008 of first mounting chassis 1502 to engage side receiving surface 1208 of second mounting chassis 1504 and to resist relative horizontal movement between the chassis. Furthermore, vertical loading would cause shank portion of first mounting chassis 1504 to press against a corresponding sidewall of side toe slot 1210 of second mounting chassis 1504 to resist relative vertical movement between the chassis.

Figure 15D:
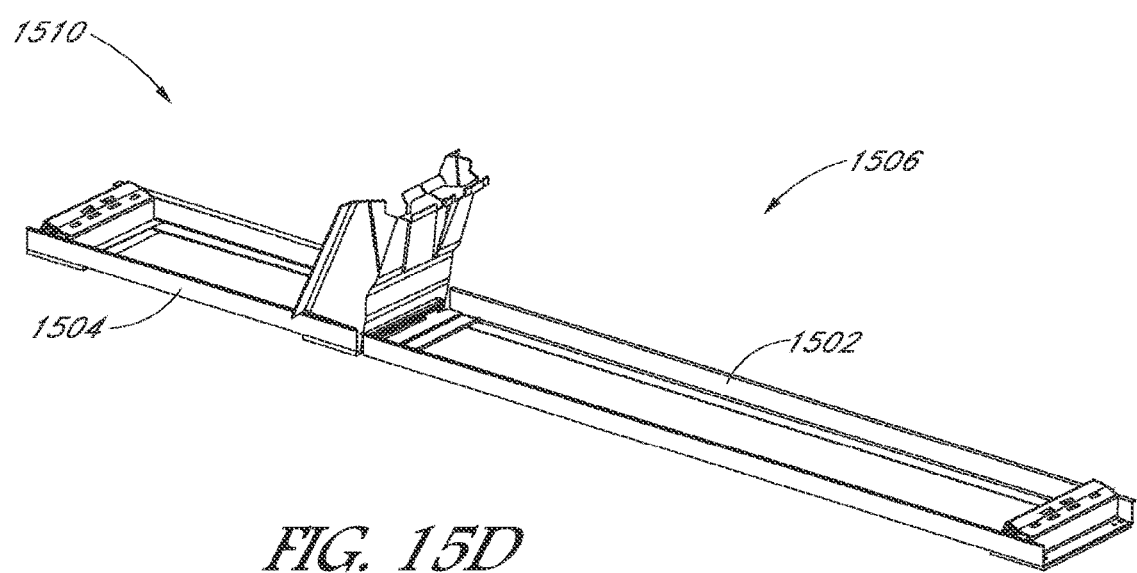

Referring to FIG. 15D, at operation 1408, the locked mounting assembly 1506 may be secured to the installation surface. For example, screws or other fasteners may be placed through attachment openings 802 in the chassis rails to secure mounting assembly 1506 to an external structure, e.g., a roof.

Figure 16:
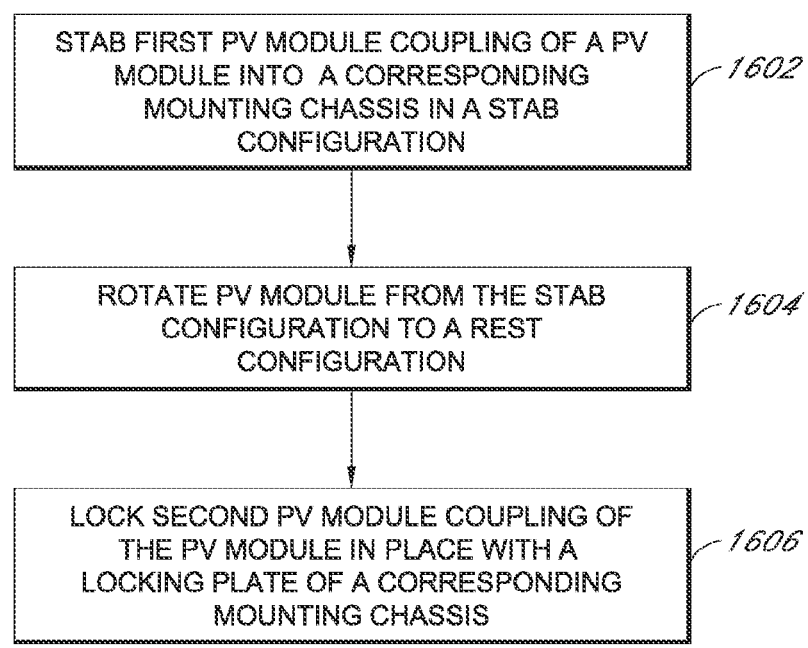
FIG. 16 provides a flowchart of a method of mounting a PV module on a mounting assembly, in accordance with an embodiment of the disclosure.

Referring to FIG. 16, a flowchart of a method of mounting a PV module on a mounting assembly is provided in accordance with an embodiment of the disclosure. Operations of the method are pictorially illustrated in FIGS. 17A-17C, and thus, the numbered operations of FIG. 16 shall be described below in relation to the corresponding pictorial illustrations.

Figure 17A:
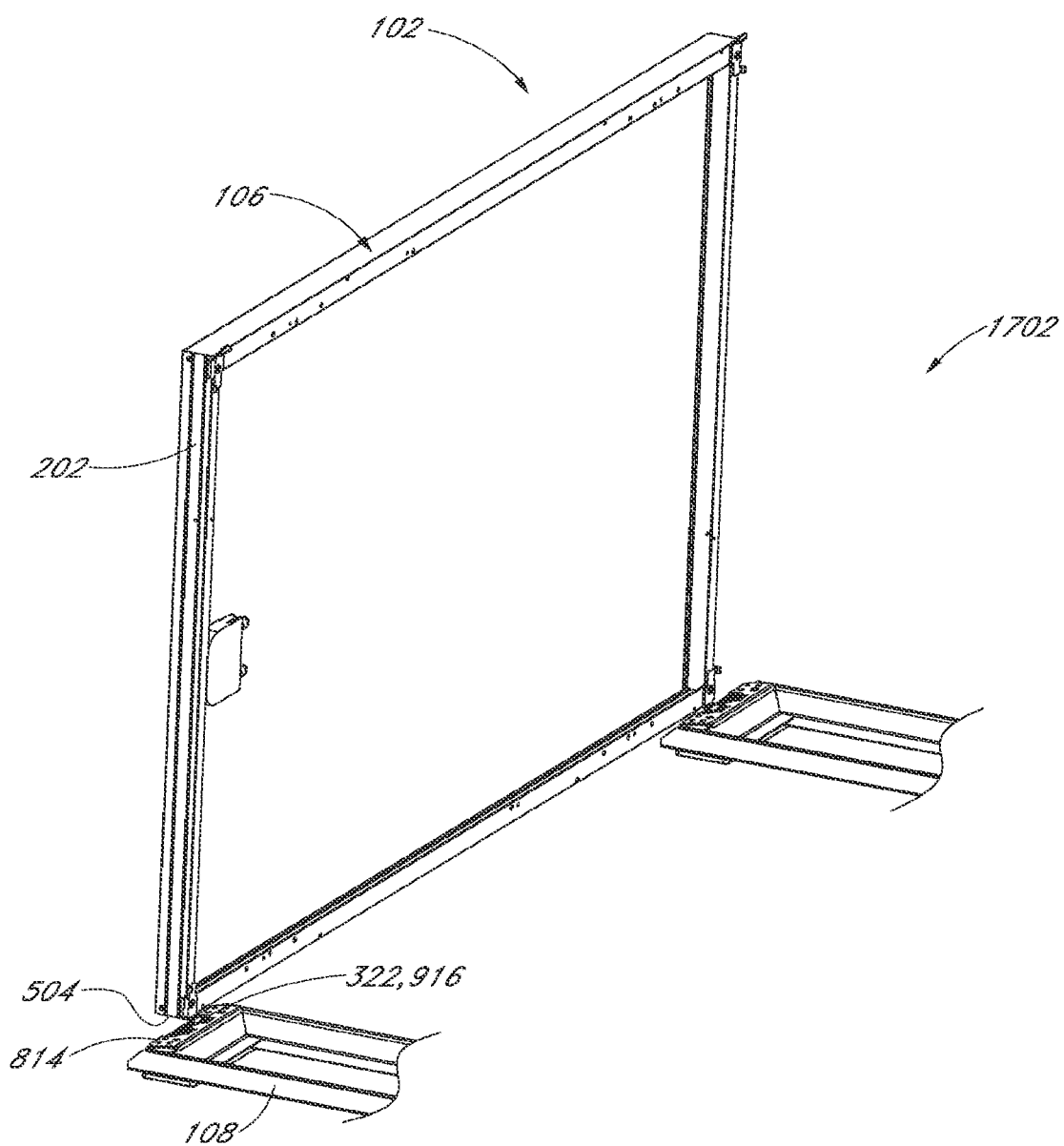
FIGS. 17A-17C illustrate perspective views of various operations in a method of mounting a PV module on a mounting assembly, in accordance with an embodiment of the disclosure.

Referring to FIG. 17A, at operation 1602, PV module 102 is stabbed into a corresponding mounting chassis 108. More particularly, PV module frame 106 including elongated frame rail 202 and a toe portion extending from frame rail 202. The toe portion may be inserted into a corresponding toe slot of mounting chassis 108. For example, toe 322 may insert into upper toe slot 916 of grounding plate 814. In a stab configuration 1702, i.e., in the configuration shown, frame rail 202 may be essentially orthogonal to grounding cap 908 such that toe 322 extends vertically downward and can be inserted into upper toe slot 916.

Figure 17B:
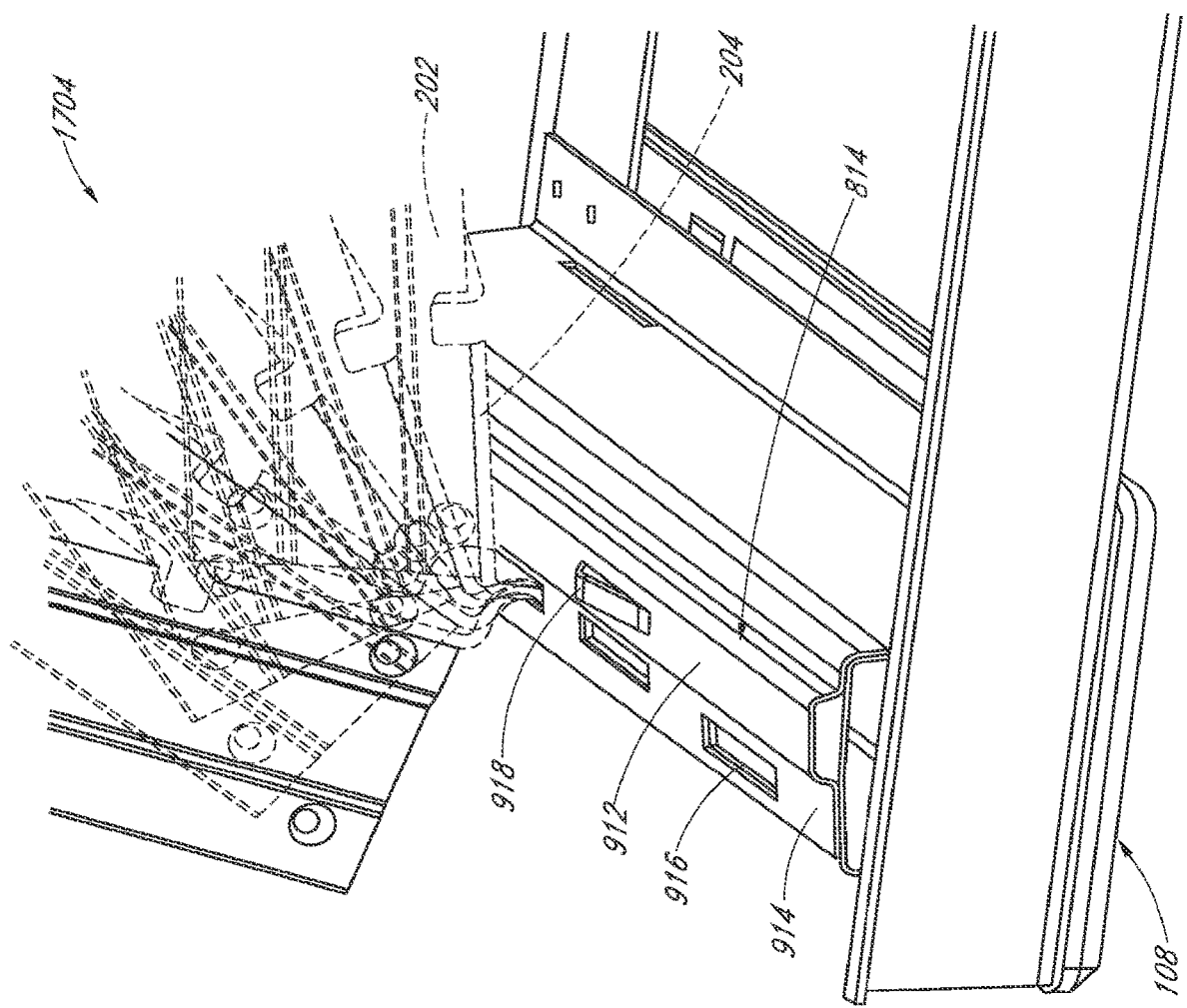

Referring to FIG. 17B, at operation 1604, PV module frame 106 is rotated into a rest configuration 1704. More particularly, frame rail 202 is pivoted about toe 322 (hidden behind grounding plate 814) from stab configuration 1702 to rest configuration 1704. In rest configuration 1704, frame rail 202 is tilted and extends between grounding plate 814 at one end of mounting chassis 108, e.g., on first mounting chassis 1502, and module stand 1102 at another end of mounting chassis 108, e.g., on second mounting chassis 1504.

As described above, grounding plate 814 includes contact portion 912 having contact surface 918 vertically higher than upper receiving surface 914. For example, contact surface 918 may be on a raised portion of spring contact 920. Thus, when PV module coupling 204 is pivoted about toe 322 within upper toe slot 916, body plate 302 may change from a vertical orientation to a tilted orientation to press against contact surface 918 (hidden beneath PV module coupling 204). Accordingly, physical contact between PV module coupling 204 and contact surface 918 electrically connects grounding plate 814 at one end of mounting chassis 108 to module stand 1102 at the other end of mounting chassis 108 through frame rail 202.

In rest configuration 1704, with PV module coupling 204 tilted away from the vertical orientation of stab configuration 1702, terminal edge of toe 322 also pivots underneath grounding cap 908 to a location longitudinally offset from upper toe slot 916. More particularly, an upper surface of toe 322 faces a lower surface of grounding cap 908 in rest configuration 1704. Thus, toe 322 hooks around grounding cap 908 such that a vertical load, e.g., pulling upward on frame rail 202, does not dislodge PV module 102 from mounting chassis 108. That is, in rest configuration 1704, vertical relative movement between PV module 102 and mounting chassis 108 is resisted by contact between toe 322 and grounding plate 814, and removal of toe 322 from upper toe slot 916 is inhibited.

Figure 17C:
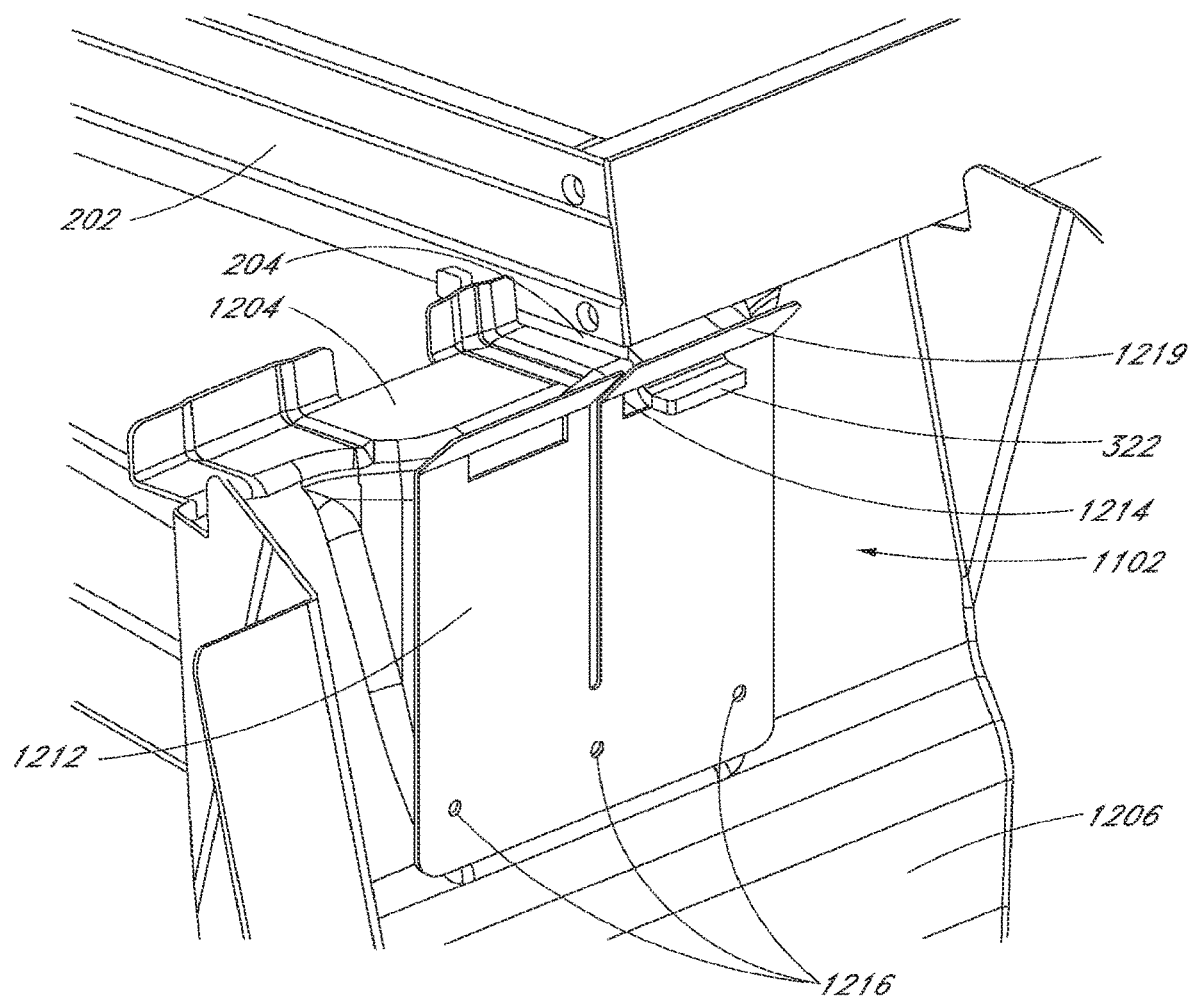

Referring to FIG. 17C, at operation 1606, toe 322 of a PV module coupling 204 attached to frame rail 202 snaps into place to be locked by locking plate 1212 of module stand 1102. In the rest configuration 1704, frame rail 202 may rest on support surface 1204 of module stand 1102. Module stand 1102 may be a portion of an adjacent mounting chassis connected to mounting chassis 108 having grounding plate 814 using the method described above. Thus, the grounding connection from grounding plate 814 to module stand 1102 through frame rail 202 may be a grounding connection between separate mounting chassis in mounting assembly 1506. PV module coupling 204 may complete the grounding connection between frame rail 202 and module stand 1102. More particularly, PV module coupling 204 may be sandwiched between frame rail 202 and support surface 1204 to provide the grounding connection between the components.

Toe 322, which is shown extending in the longitudinal direction away from an opposite end of frame rail 202 as the toe 322 that engages grounding plate 814 in FIG. 17B, may engage locking toe slot 1214 in locking plate 1212 of module stand 1102. Locking plate 1212 may be attached to upright 1206 of module stand 1102 at one or more hinge points 1216, e.g., rivet joints. Furthermore, locking plate 1212 may include striking panel 1219 extending from upper locking surface edge 1218 of locking surface 1302. Thus, as frame rail 202 and/or PV module coupling 204 pivot downward onto support surface 1204 from stab configuration 1702 to rest configuration 1704, toe 322 contacts striking surface 1220 of striking panel 1219 to resiliently deflect locking plate 1212 away from upright 1206 such that toe 322 may pass between upright 1206 and locking plate 1212. Locking toe slot 1214 may be aligned with toe 322 and may be vertically below support stand, however, such that when toe 322 drops to a same vertical level as locking toe slot 1214, locking plate 1212 flexes back toward upright 1206, and toe 322 snaps into place and engages locking toe slot 1214. Thus, upper locking surface edge 1218 is above an upper surface of toe 322 between retention surface 320 and terminal edge 324 when PV module coupling 204 rests on support surface 1204. As such, vertical relative movement between frame rail 202 and module stand 1102 is resisted, e.g., as when frame rail 202 is pulled upward. That is, upward motion of frame rail 202 is resisted by contact between locking plate 1212 and toe 322. To pivot frame rail 202 upward after it has reached the rest configuration 1704, an operator (e.g., a maintenance worker) may manually deflect locking plate 1212 away from upright 1206 to disengage locking plate 1212 from toe 322 so that frame rail 202 may then be lifted upward. Accordingly, the engagement between PV module couplings 204 and corresponding toe slots in mounting chassis 108 provides a strong module interface attachment that resists external loading, e.g., wind loading.

Figure 18:
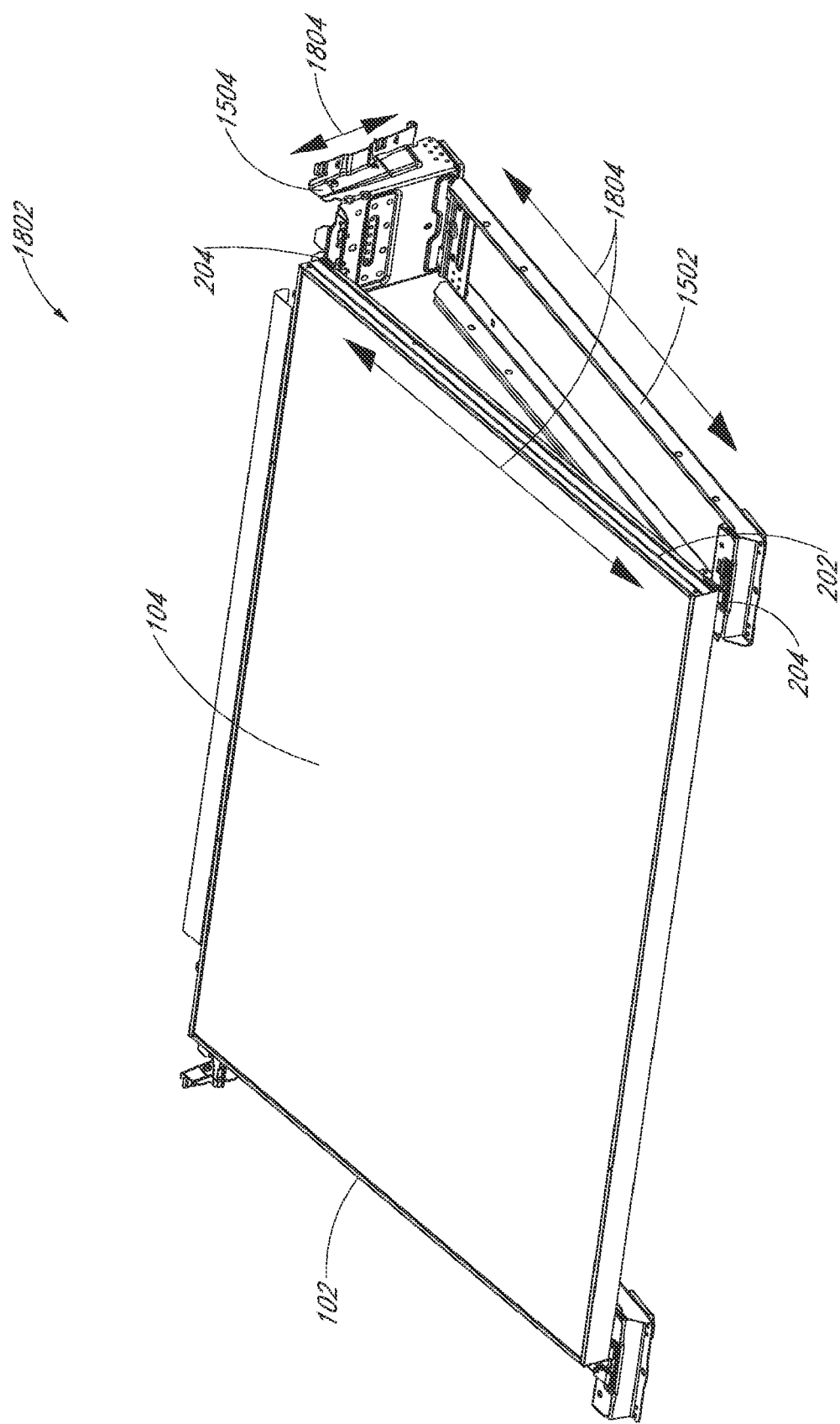
FIG. 18 illustrates a perspective view of a PV module assembly of a PV module system, in accordance with an embodiment of the disclosure.

Referring to FIG. 18, a perspective view of a PV module assembly of a PV module system is illustrated in accordance with an embodiment of the disclosure. A PV module assembly 1802 may include a PV module 102 assembled to one or more mounting chassis 108, e.g., first mounting chassis 1502 and second mounting chassis 1504, as described above. In an embodiment, PV module assembly 1802 provides integral grounding between PV panel 104 and the various frame components that support PV panel 104, e.g., frame rails 202 and mounting chassis 1502, 1504. That is, a ground path 1804 may be established through the entire frame of PV module assembly 1802 by PV module couplings 204 that connect frame rail 202 to the mounting chassis 108.

PV module assembly 1802 constructed using the components and in the manner described above provides for a PV mounting system that accommodates thermal expansion, provides integral grounding between system components, and adequately resists external forces and moments, e.g., wind loading. Thus, mounting components to support PV modules, including PV module couplings and PV module mounting chassis, have been disclosed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A photovoltaic (PV) module, comprising:
a PV panel having a surface;
a first coupling having a first surface which extends parallel to the surface of the PV panel; and
a second coupling having a second surface which extends parallel to the surface of the PV panel, wherein
the first coupling includes a first toe configured to be inserted into a grounding toe slot of a PV module mounting chassis when the PV module is in a first configuration, the first toe being configured to inhibit removal of the first toe from the grounding toe slot when the PV module is in a second configuration, the first toe extending outward beyond the PV panel in a direction parallel to the first surface from a first retainer to a first terminal edge, the first toe having a first tongue portion extending in the direction parallel to the first surface between the first retainer and the first terminal edge, and the first retainer extending beyond the PV panel, and
the second coupling includes a second toe configured to engage a locking toe slot of the PV module mounting chassis when the PV module is in the second configuration, the PV module being configured to be pivoted about the first toe to engage the second toe through the locking toe slot, the second toe extending outward beyond the PV panel in a direction parallel to the second surface from a second retainer to a second terminal edge, the second toe having a second tongue portion extending in the direction parallel to the second surface between the second retainer and the second terminal edge, and the second retainer extending beyond the PV panel.

2. The PV module of claim 1, wherein the first and second toes of the PV module are configured to be connected to the PV module mounting chassis by tool-less connections.

3. The PV module of claim 2, wherein at least one of the tool-less connections comprises a locking plate being reversibly deflectable to an outward position to engage at least one toe of the PV module, thereby locking the PV module into the second configuration.

4. The PV module of claim 1, wherein the first and second toes of the PV module are configured to electrically ground the PV module to the PV module mounting chassis in the second configuration.

5. A photovoltaic (PV) module mounting chassis, comprising:
a grounding toe slot at a first end, the grounding toe slot being a first aperture configured to receive a first toe of a PV module such that a first terminal edge of the first toe enters the first aperture on a first side of the first aperture and exits the first aperture on a second side of the first aperture, the first toe to be inserted into the grounding toe slot when the PV module is in a first configuration, the grounding toe slot configured to inhibit removal of the first toe from the grounding toe slot when the PV module is in a second configuration, the first toe extending outward beyond a PV panel of the PV module from a first retainer to the first terminal edge, the first toe having a first tongue portion extending between the first retainer and the first terminal edge, and the first retainer extending beyond the PV panel; and
a locking toe slot at a second end opposite from the first end, the locking toe slot being a second aperture configured to engage a second toe of the PV module such that a second terminal edge of the second toe enters the second aperture on a first side of the second aperture and exits the first aperture on a second side of the second aperture when the PV module is in the second configuration, the locking toe slot being configured to engage the second toe through the locking toe slot when the PV module is pivoted about the first toe, the second toe extending outward beyond the PV panel from a second retainer to the second terminal edge, the second toe having a second tongue portion extending between the second retainer and the second terminal edge, and the second retainer extending beyond the PV panel.

6. The module mounting chassis of claim 5, further comprising:
a grounding plate located at the first end; and
a module stand located at the second end, the module stand comprising a base portion and an upright extending from the base portion to a support surface,
wherein the support surface of the upright is vertically higher than the grounding plate to hold the PV module in a tilted state in the second configuration.

7. The module mounting chassis of claim 6, further comprises a bridging member having a first member end and a second member end, the bridging member coupled to the grounding plate at the first member end and coupled to the module stand at the second member end.

8. The module mounting chassis of claim 6, wherein the grounding plate comprises a contact portion including a spring contact being deflectable upon contact with the PV module.

9. The module mounting chassis of claim 6, wherein the module stand further includes a pair of alignment protrusions extending upward from the support surface.

10. The module mounting chassis of claim 9, wherein
the pair of alignment protrusions define a rail notch between the pair of alignment protrusions and the support surface, and
the rail notch is longitudinally aligned with the locking toe slot.

11. The module mounting chassis of claim 6, wherein
the module stand further comprises a locking plate having a locking surface coupled to the upright, and
the locking toe slot extends through the locking surface of the locking plate.

12. The module mounting chassis of claim 11, wherein the locking plate attached to the upright at a hinge point and the locking surface is resiliently deflectable away from the upright about the hinge point.

13. The module mounting chassis of claim 11, wherein the locking plate includes a striking surface extending from an upper edge of the locking surface at an oblique angle to the support surface.

* * * * *